United States Patent [19]
Smith et al.

[11] Patent Number: 6,078,461
[45] Date of Patent: *Jun. 20, 2000

[54] IN SITU OFFSET CORRECTION FOR POSITION ERROR SIGNAL

[75] Inventors: Gordon J. Smith; Hal Hjalmar Ottesen, both of Rochester, Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,373

[22] Filed: Jun. 12, 1997

[51] Int. Cl.$^7$ ................................................... G11B 5/596
[52] U.S. Cl. ................................... 360/77.08; 360/77.06; 360/77.04
[58] Field of Search ............................. 360/77.01, 77.02, 360/77.06, 77.08, 77.11, 77.04

[56] References Cited

U.S. PATENT DOCUMENTS

| | | | |
|---|---|---|---|
| 4,204,234 | 5/1980 | Noble | 360/109 X |
| 4,371,960 | 2/1983 | Kroiss | 369/43 |
| 4,412,165 | 10/1983 | Case et al. | 318/636 |
| 4,485,418 | 11/1984 | Bremmer | 360/77.06 |
| 4,513,333 | 4/1985 | Young et al. | 360/77.02 |
| 4,797,756 | 1/1989 | Yoshihara et al. | 360/77.02 |
| 4,802,033 | 1/1989 | Chi | 360/77.04 |
| 4,939,599 | 7/1990 | Chainer et al. | 360/77.03 |
| 5,210,662 | 5/1993 | Nishijima | 360/77.04 |
| 5,233,487 | 8/1993 | Christensen et al. | 360/77.04 |
| 5,426,544 | 6/1995 | Narita et al. | 360/77.04 |
| 5,455,724 | 10/1995 | Suzuki et al. | 360/77.04 |
| 5,455,787 | 10/1995 | Suzuki | 360/77.04 |
| 5,523,902 | 6/1996 | Pederson | 360/77.08 |
| 5,555,142 | 9/1996 | Komai et al. | 360/77.06 |

FOREIGN PATENT DOCUMENTS

| | | |
|---|---|---|
| 61-229278 | 10/1986 | Japan . |
| 2-198075 | 8/1990 | Japan . |
| WO 96/10821 | 4/1996 | WIPO . |

OTHER PUBLICATIONS

"Read/Write Offset Measurement by Head Switching", *IBM Technical Disclosure Bulletin*, 37(5) (May 1994).

"Self–Move Servo Design Method", *IBM Technical Disclosure Bulletin*, 38(10) (Oct. 1995).

*Primary Examiner*—Andrew L. Sniezek
*Attorney, Agent, or Firm*—Tyler L. Nasiedlak; Mark A. Hollingsworth

[57] ABSTRACT

The present invention generally provides a method and system for correcting for offset in a position error signal. In accordance with one embodiment of the invention, the readback signals dependent upon a read sensitivity profile of a read head are generated by moving the read head over a correction track. Using the readback signals, a characteristic value of the read sensitivity profile is determined. The characteristic value of the read sensitivity profile is used to adjust raw position error signals generated using the read head. The characteristic value may, for example, be determined from one or more data points from a cumulative sum data set. In accordance with another embodiment of the invention, a storage device is provided. The storage device includes a read head and a storage medium which includes a correction track and which is mounted to allow relative movement between the read head and the storage medium. The storage device further includes a servo control system. The servo control system generates readback signals dependent upon a read sensitivity profile of the read head by incrementally moving the read head over the correction track and determines a characteristic value of the read sensitivity profile using the readback signals. The servo control system further generates the raw position error signal by demodulating induced signals in the read head and uses the characteristic value of the read sensitivity profile to adjust the raw position error signal.

32 Claims, 23 Drawing Sheets

IN SITU OFFSET CORRECTION FOR POSITION ERROR SIGNAL

FIELD OF THE INVENTION

The present invention relates generally to data storage systems, and, more particularly, to a method and apparatus for correcting offsets in position error signals.

BACKGROUND OF THE INVENTION

A typical data storage system includes a magnetic medium for storing data in magnetic form and a transducer used to read and/or write magnetic data from/to the storage medium. A disk storage device, for example, includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator assembly and passed over the surface of the rapidly rotating disks.

The actuator assembly typically includes a coil assembly and a plurality of outwardly extending arms having flexible suspensions with one or more transducers and slider bodies being mounted on the suspensions. The suspensions are interleaved within the stack of rotating disks, typically by means of an arm assembly (E/Block) mounted to the actuator assembly. The coil assembly generally interacts with a permanent magnet structure, and is responsive to a controller. A voice coil motor (VCM) is also mounted to the actuator assembly diametrically opposite the actuator arms.

In a typical digital data storage system, digital data is stored in the form of magnetic transitions on a series of concentric, spaced tracks comprising the surface of the magnetizable rigid data storage disks. The tracks are generally divided into a plurality of sectors, with each sector comprising a number of information fields. One of the information fields is typically designated for storing data, while other fields contain track and sector position identifications and synchronization information, for example. Data is transferred to, and retrieved from, specified track and sector locations by the transducers which follow a given track and move from track to track, typically under the servo control of a controller.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

Conventional data storage systems generally employ a closed-loop servo control system for positioning the actuator and read/write transducers to specified storage locations on the data storage disk. During normal data storage system operation, a servo transducer, generally mounted proximate the read/write transducers, or, alternatively, incorporated as the read element of the transducer, is typically employed to read information for the purpose of following a specified track (track following) and seeking specified track and data sector locations on the disk (track seeking).

A servo track writing procedure is typically implemented to initially record servo pattern information on the surface of one or more of the data storage disks. A servo track writer (STW) assembly is typically used by manufacturers of data storage systems to facilitate the transfer of servo pattern data to one or more data storage disks during the manufacturing process.

In accordance with one known STW technique, embedded servo pattern information is written to the disk along segments extending in a direction generally outward from the center of the disk. The embedded servo pattern is thus formed between the data storing sectors of each track. It is noted that a servo sector typically contains a pattern of data, often termed a servo burst pattern, used to maintain optimum alignment of the read/write transducers over the centerline of a track when reading and writing data to specified data sectors on the track. The servo information may also include sector and track identification codes which are used to identify the position of the transducer.

The servo burst pattern typically induces signals in the read element (readback signals) which are used to develop a position error signal (PES signal). The PES signal is used to maintain the transducer over the centerline of the track. An offset in the PES signal generally causes a servo system to position the transducer offtrack (i.e., spaced from the centerline of a track). If offsets in a PES signal change over time, deleterious write-to-write track misregistration and write-to-read track misregistration can occur. For example, when a track is written using a PES signal with no offset and later read with an offset PES signal, there may be errors in the information read. Similarly, when a track is written using a PES signal with no offset and an adjacent track is written with an offset PES signal, there may be errors in the information written to the tracks.

SUMMARY OF THE INVENTION

The present invention generally provides a method and system for correcting for offset in a position error signal. This can, for example, allow increases in the track density of a storage medium and increases in the capacity of a data storage device. Also improved can be, for example, the seeking and tracking of a data storage device.

In accordance with one embodiment of the invention, readback signals dependent upon a read sensitivity profile of a read head are generated by moving the read head over a correction track. Using the readback signals, a characteristic value of the read sensitivity profile is determined. The characteristic value of the read sensitivity profile is used to adjust raw position error signals generated using the read head. The characteristic value may, for example, be determined from one or more data points from a cumulative sum data set.

In accordance with another embodiment of the invention, a storage device is provided. The storage device includes a read head and a storage medium which includes a correction track and which is mounted to allow relative movement between the read head and the storage medium. The storage device further includes a servo control system. The servo control system generates readback signals dependent upon a read sensitivity profile of the read head by moving the read head over the correction track and determines a characteristic value of the read sensitivity profile using the readback signals. The servo control system further generates the raw position error signal using the read head and uses the characteristic value of the read sensitivity profile to adjust the raw position error signal.

The above summary of the present invention is not intended to describe each illustrated embodiment or aspect of the present invention. The figures and the detailed description which follow more particularly exemplify these embodiments and aspects.

BRIEF DESCRIPTION OF THE DRAWINGS

The invention may be more completely understood in consideration of the following detailed description of various embodiments of the invention in connection with the accompanying drawings, in which.

Figure 1:
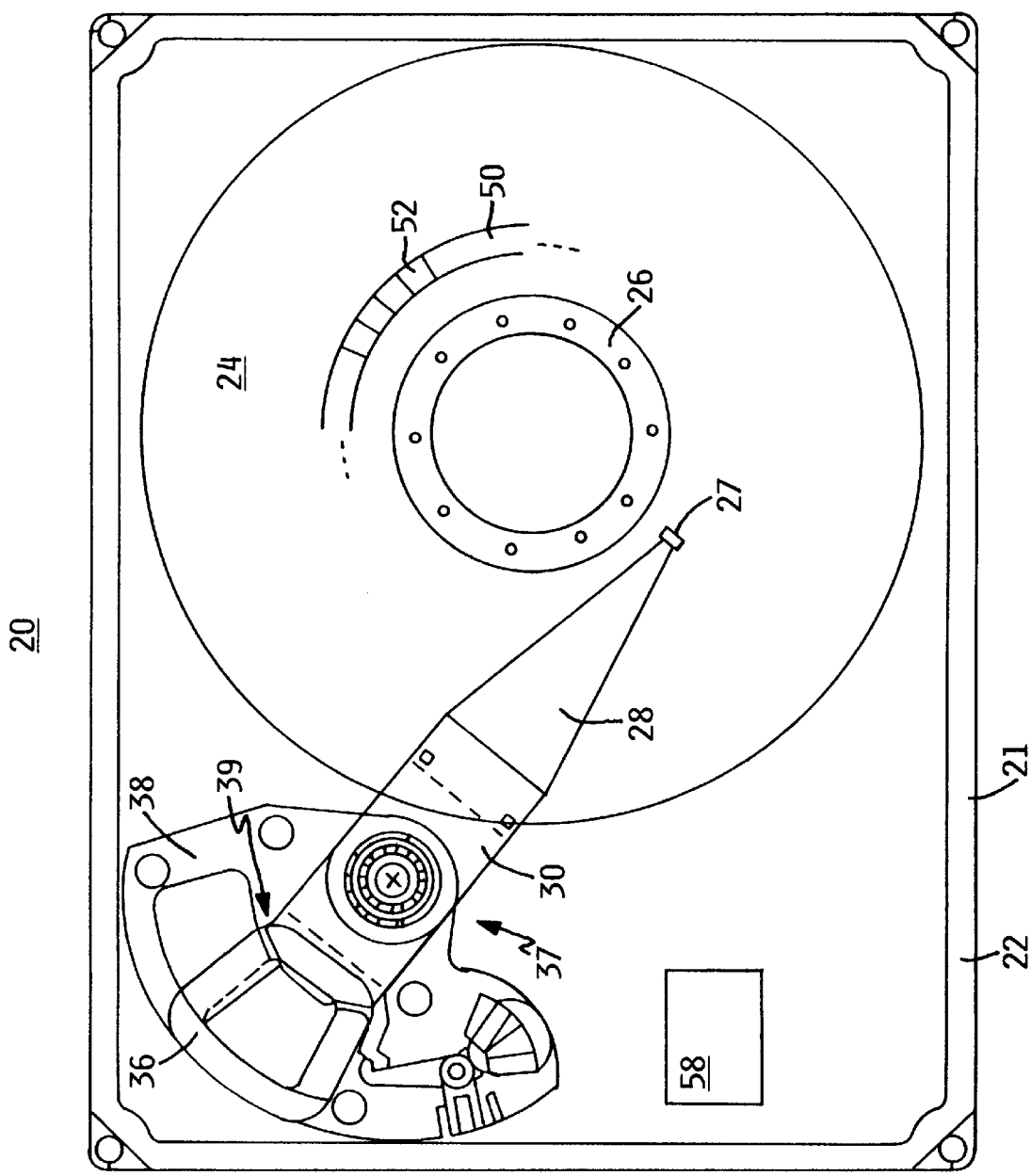
FIG. 1 is a top view of an exemplary data storage system with its upper housing cover removed.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE EMBODIMENTS

The present invention generally relates to servo control systems and, more particularly, provides a method and system for correcting for offset in a position error signal. The invention is particularly suited to correct for offsets resulting from magnetoresistive (MR) read elements having asymmetric read sensitivity profiles. However, the invention is not so limited. Any type of read head having a read sensitivity profile which is asymmetric and/or can change over time is intended to be covered by the present invention. Moreover, many types of servo control system can benefit from the present invention. An appreciation of various aspects and features of the invention will be gained through a discussion of exemplary embodiments below. These embodiments are illustrative only and are not intended to limit the present invention.

Figure 2:
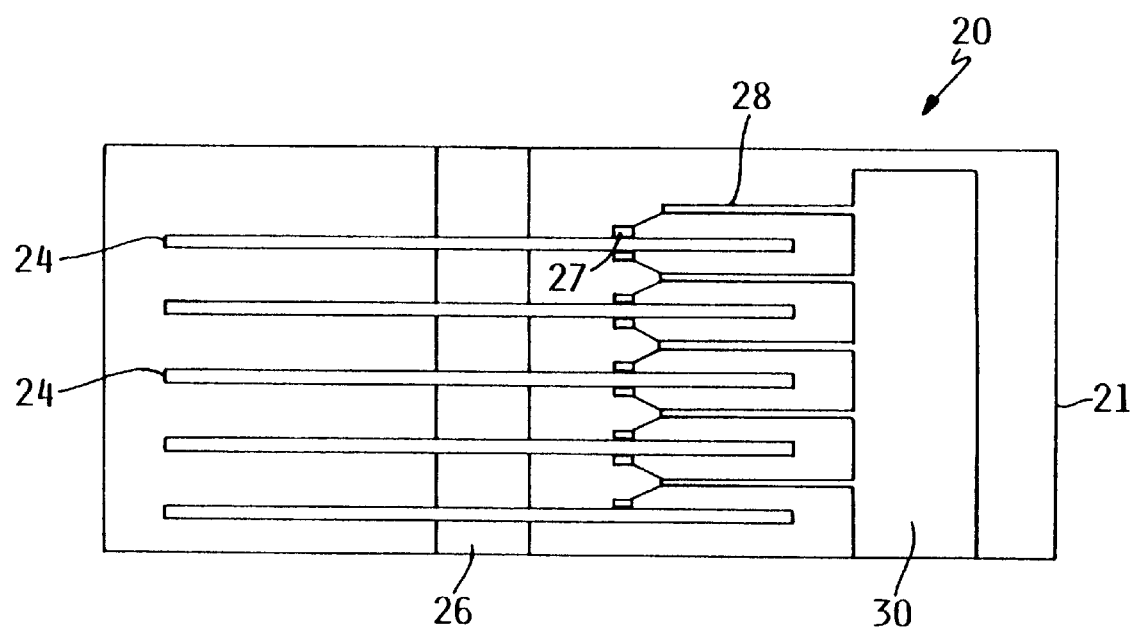
FIG. 2 is a side plan view of the exemplary data storage system of FIG. 1.

Referring now to the drawings, and more particularly to FIGS. 1 and 2, there is shown an exemplary data storage system 20 with its cover (not shown) removed from the base 22 of the housing 21. The data storage system 20 is shown by way of example and not of limitation. Many different types of data storage systems can benefit from the present invention. The data storage system 20 typically includes one or more rigid data storage disks 24 which rotate about a spindle motor 26. An actuator assembly 37 typically includes a plurality of interleaved actuator arms 30, with each arm having one or more suspensions 28 and transducers 27. The transducers 27 are generally provided to read and write information from and to the data storage disks 24. Each transducer 27 generally includes a read head, such as an MR read element, and a write head, such as an MR write element. The actuator assembly 37 includes a coil assembly 36 which cooperates with a permanent magnet structure 38 to operate as an actuator voice coil motor (VCM) 39 responsive to control signals produced by a controller 58. The controller 58 preferably includes control circuitry that coordinates the transfer of data to and from the data storage disks 24, and cooperates with the VCM 39 to move the actuator arms 30, suspensions 28, and transducers 27 to prescribed track 50 and sector 52 locations when reading and writing data to and from the disks 24.

Figure 3:
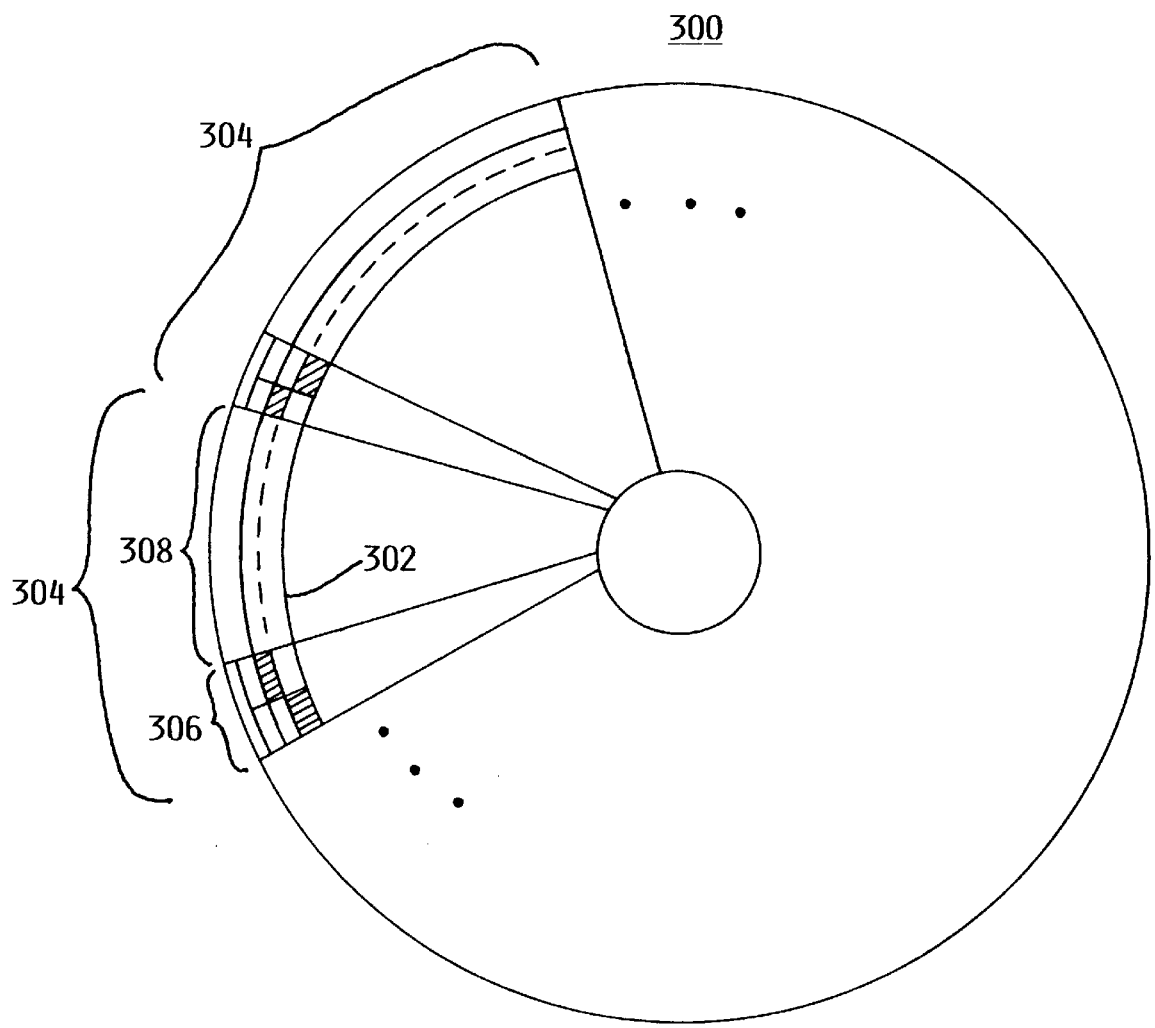
FIG. 3 is a top view of an exemplary data storage disk.

With reference to FIGS. 3–5, details of an exemplary servo control technique and an exemplary disk for use with the servo technique will be described. The exemplary servo technique and disk are illustrated for purposes of example and not of limitation. A number of servo control techniques and disks use therein are covered by the present invention. As shown in FIG. 3, the exemplary disk 300 generally includes a number of concentric tracks 302 which are generally divided into a plurality of sectors 304. Each of the sectors 304 generally includes a servo information field 306 and a data field 308. Each servo field 306 may consist of a number of subfields including, for example, a synchronization field, a Gray code field and a servo pattern field. For ease of illustration, only a servo pattern field is shown herein. In general, the servo information fields 306 induce readback signals in a read head. The readback signals are then demodulated to generate a position error signal (PES signal) which can, for example, be used to position the read transducer at the centerline of a desired track 302. As will be discussed below, the disk 300 further includes one or more offset correction zones which may be located near the inner diameter and/or the outer diameter of the disk 300.

Details of read head positioning will be discussed with reference to FIGS. 4A–4D. FIGS. 4B and 4D illustrate two read heads 402B and 402D flying over an enlarged portion 404 of a data storage disk. The disk portion 404 generally includes a servo information field 406, at least a portion of which is divided into servo patterns. While the invention is not so limited, two patterns, an A field pattern 408 and a B field pattern 410, are provided in the illustrated embodiment. The A and B servo field patterns 408 and 410 are read by the read heads 402B and 402D and the induced readback signals are demodulated and used for positioning the read heads. As each read head passes over the servo information field 406, readback signals $e_a$ and $e_b$ are induced by servo pattern A 408 and servo pattern B 410, respectively. The induce readback signals $e_a$ and $e_b$ are then demodulated to develop a position error signal (PES), for example, according to the relationship:

$$PES = \frac{e_b - e_a}{e_b + e_a} \quad [1]$$

The PES signal is provided to a servo controller which in conventional systems moves the read head 402 to maintain the PES signal equal to zero during track following. A more detailed discussion of servo information patterns and servo control systems may be found in Narita et al., U.S. Pat. No. 5,426,544, entitled "Sensitivity Correcting Circuit Of Servo Signal Detection On Data Surface And Offset Measuring Circuit And Magnetic Disk Unit," and Suzuki, U.S. Pat. No. 5,457,587, entitled "Method And System For Correcting Offset Of Head Position Signal," both of which are herein incorporated by reference.

Figure 4A:
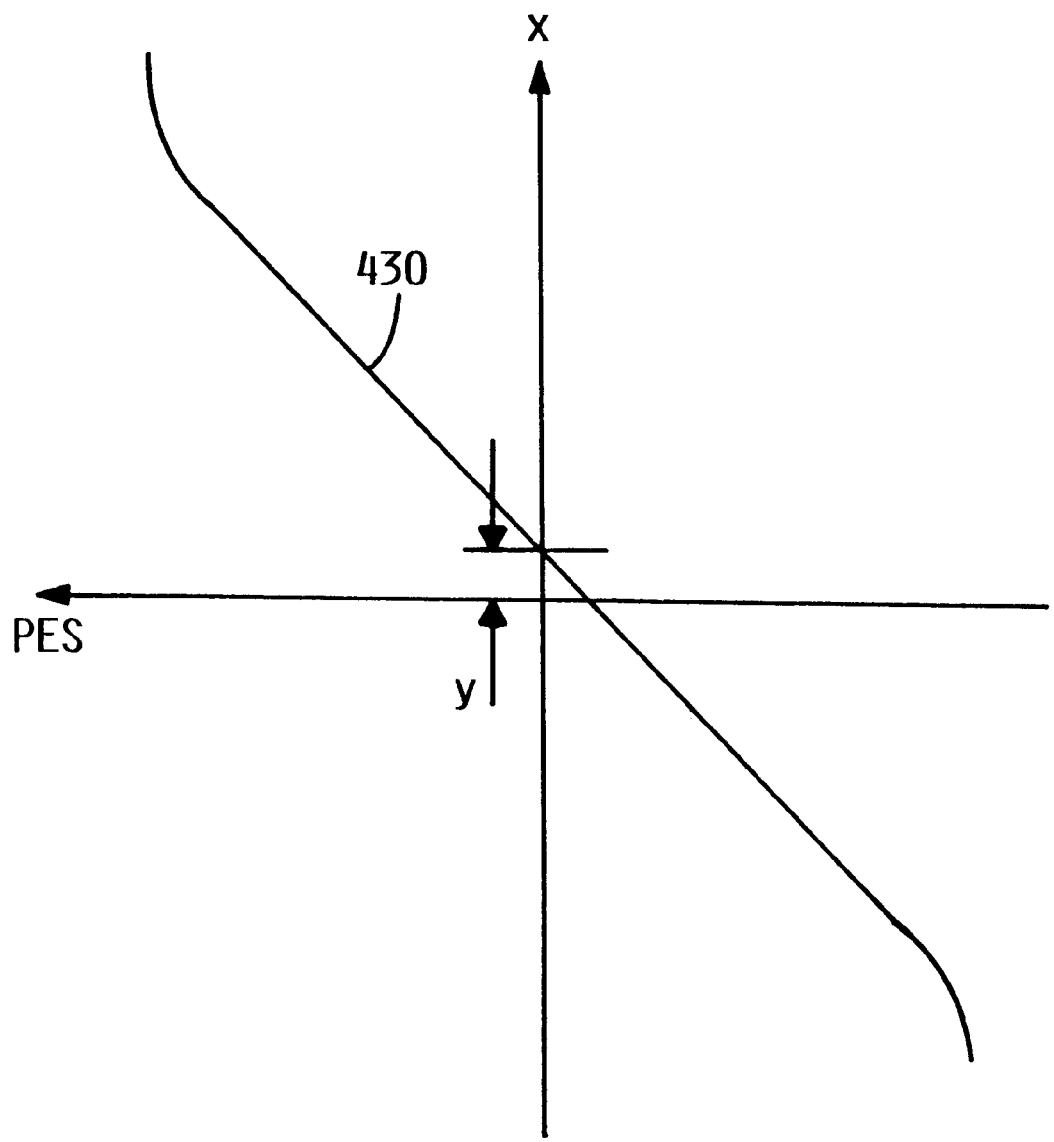
FIGS. 4A–4D illustrate exemplary disk portions and exemplary non-linear PES transfer functions.
Figure 4B:
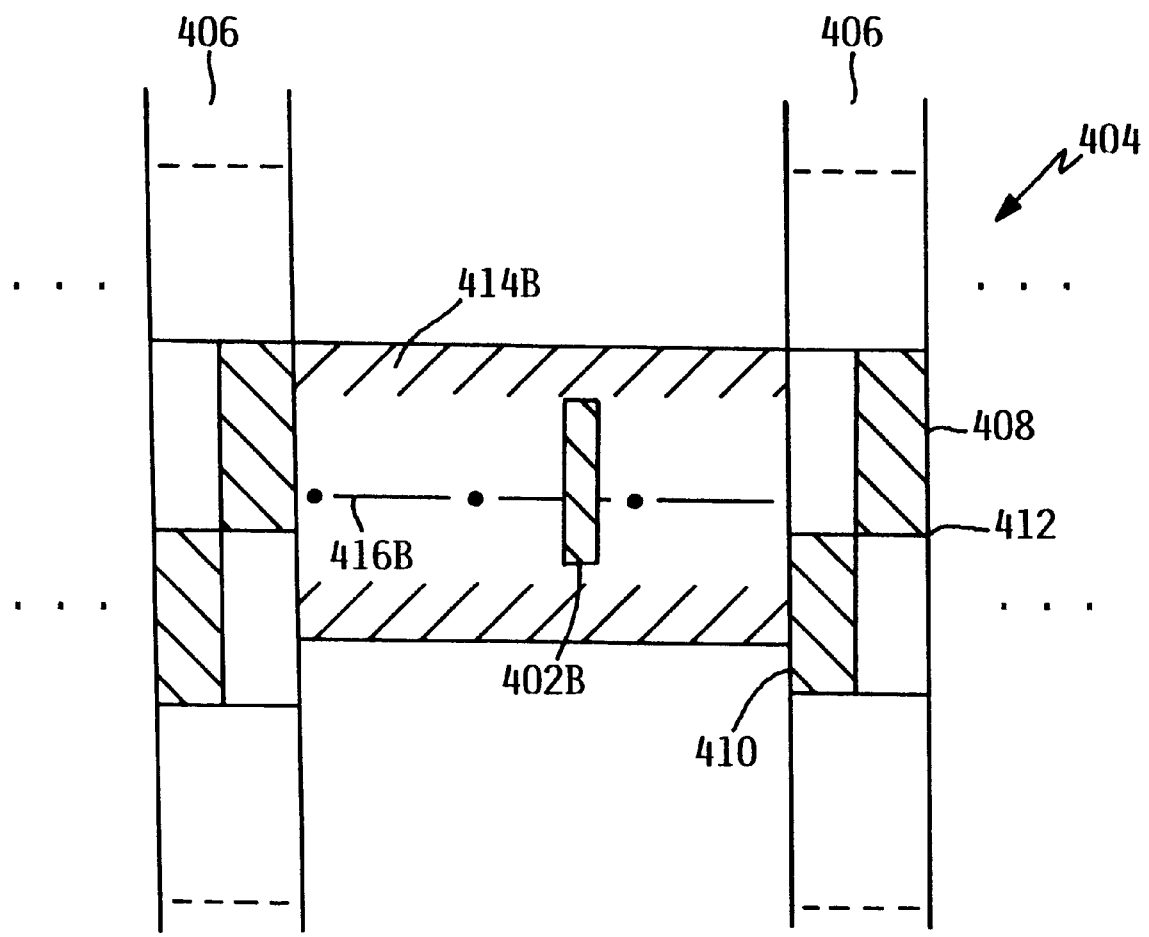
Figure 4C:
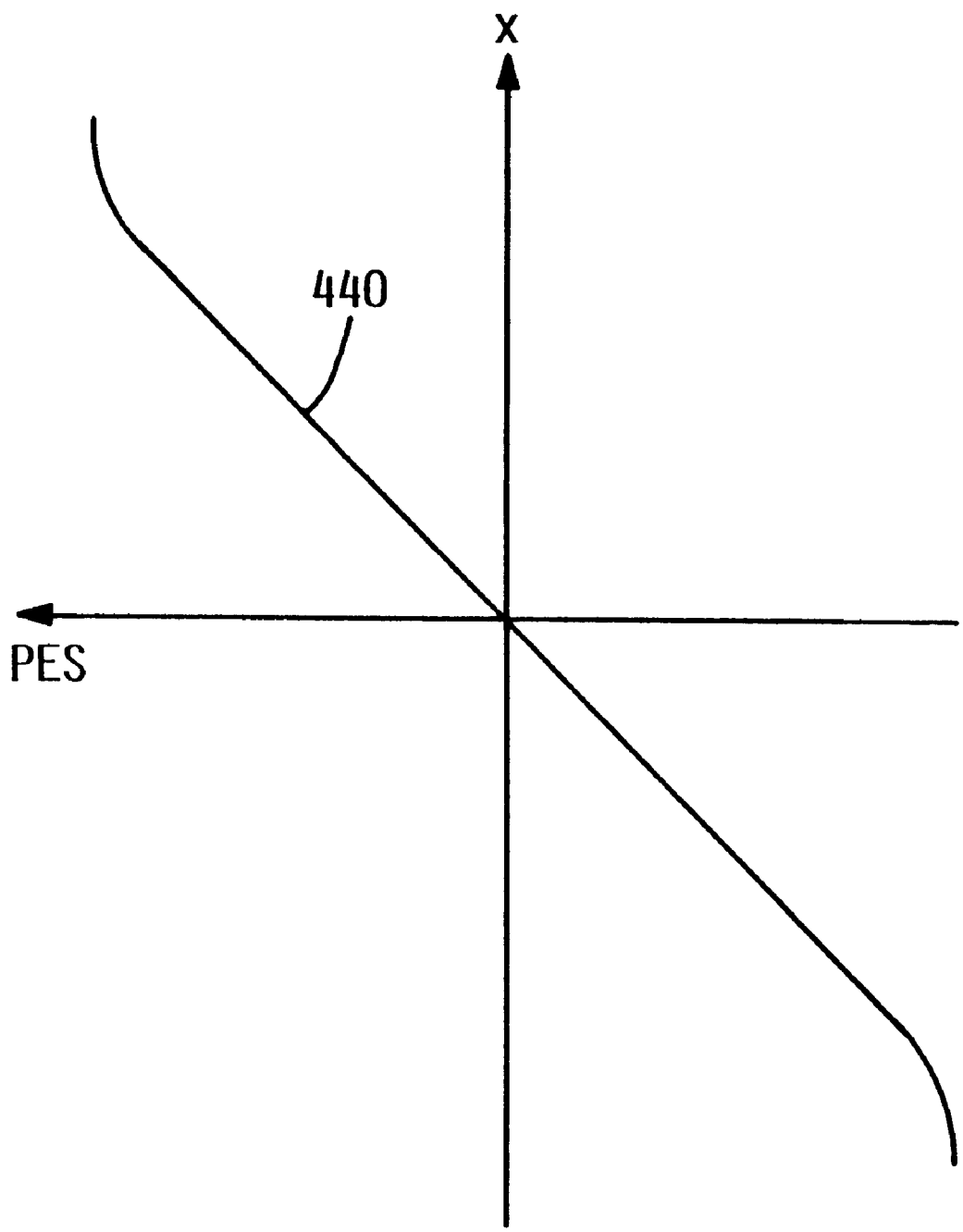
Figure 4D:
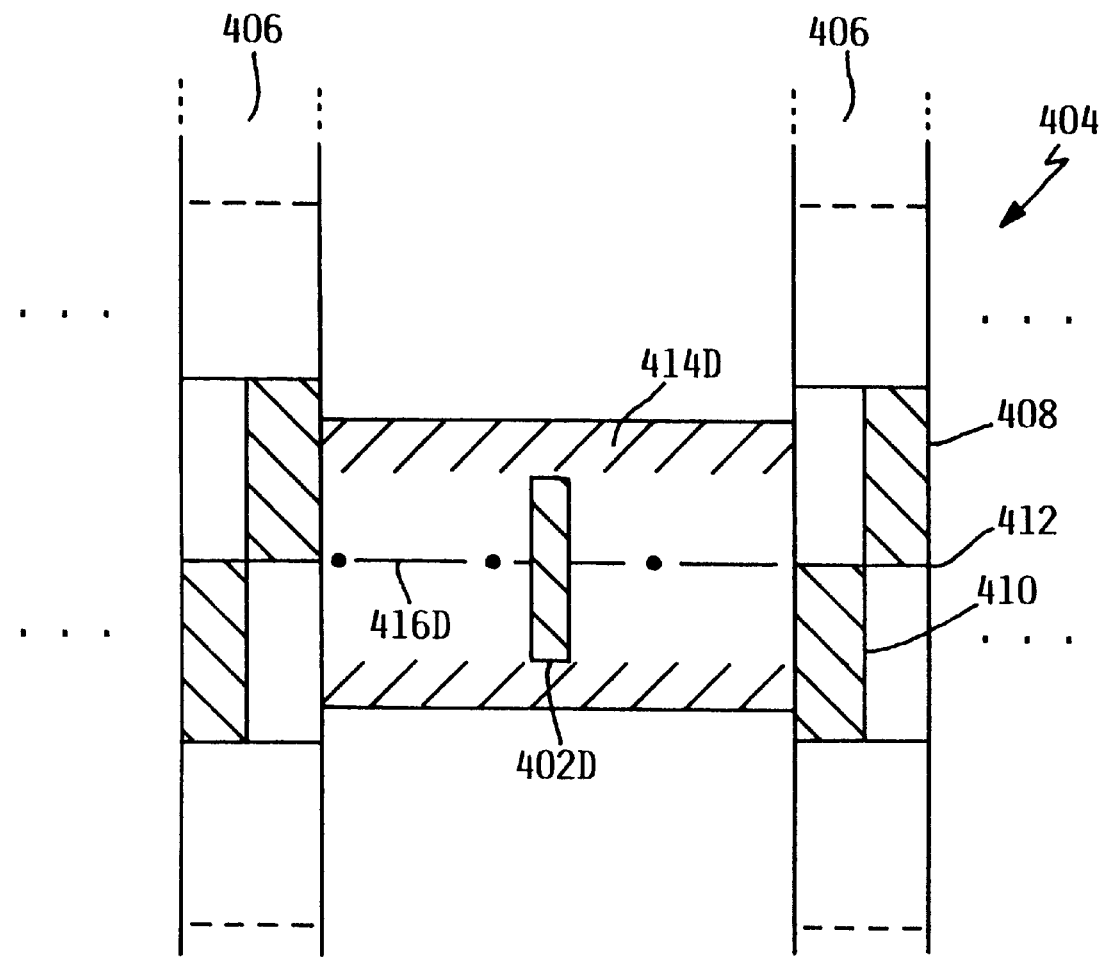

PES transfer functions 430 and 440 (i.e., PES signals as a function of offset from a servo sector centerline) for read heads 402B an 402D, respectively, are illustrated in FIGS. 4A and 4C. The PES transfer function 440 of read head 402D is zero when the read head 402D is centered with respect to the centerline 412 of the servo sector 406 (as illustrated in the FIG. 4D). A track 414D written with PES transfer function 440 will have a centerline 416D aligned with the servo sector centerline 412 (as illustrated in FIG. 4D) The PES transfer function 430 of read head 402B, in contrast, includes an offset y (as illustrated in FIG. 4A) when the PES transfer function 440 is zero. A track 414B written with the offset PES transfer 430 function has a centerline 416B which is offset from the servo sector centerline 412, as illustrated in FIG. 4B.

An offset PES transfer function, if uncompensated, results in an offset of the read head with respect to the servo sector centerline. As noted above, these offsets can result in write-to-write track misregistration and write-to-read track misregistration. For example, if a track is written using a PES transfer function with zero offset (e.g. transfer function 440) and later read using an offset PES transfer function (e.g., transfer function 430), the head will be offset with respect to the centerline of the written track and thus often causing read errors. In addition, if a track is written using an initial PES transfer function and the PES transfer function for the head changes over time, and an adjacent track is written with the changed PES transfer function, then the tracks may overlap, thus causing induced adjacent track errors when the adjacent tracks are read.

Figure 5A:
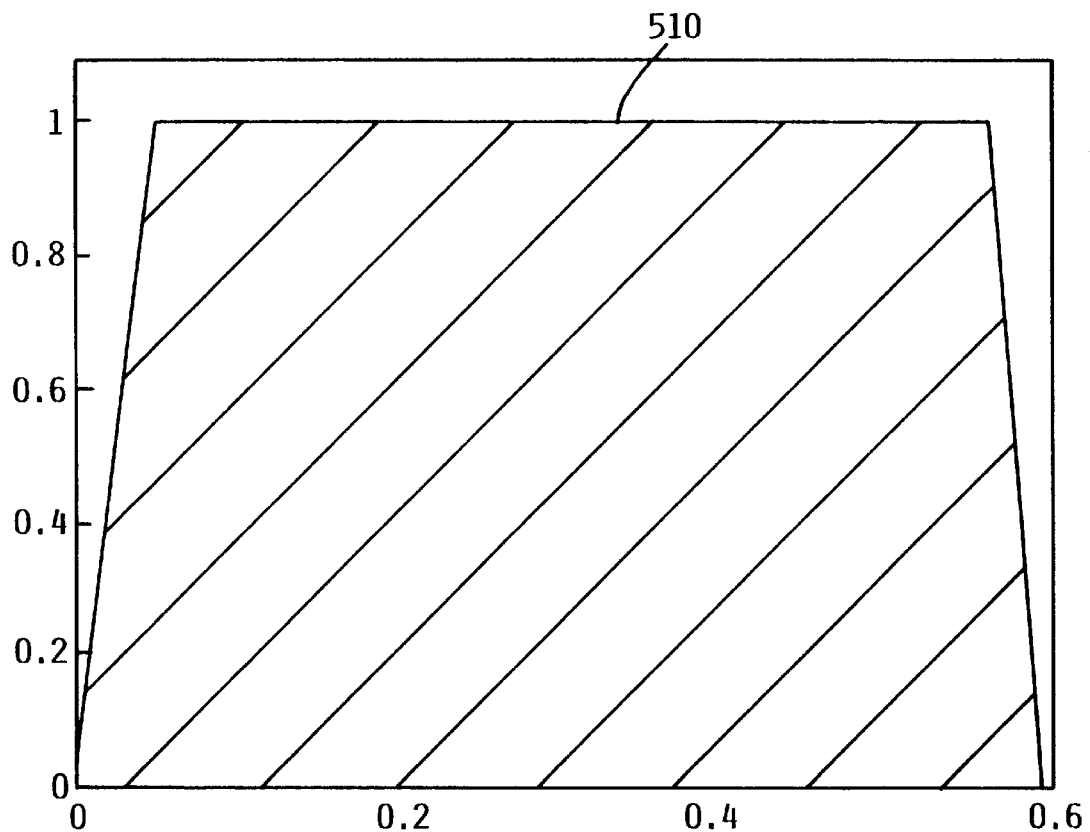
FIGS. 5A–5C illustrate exemplary simulated read sensitivity profiles.
Figure 5B:
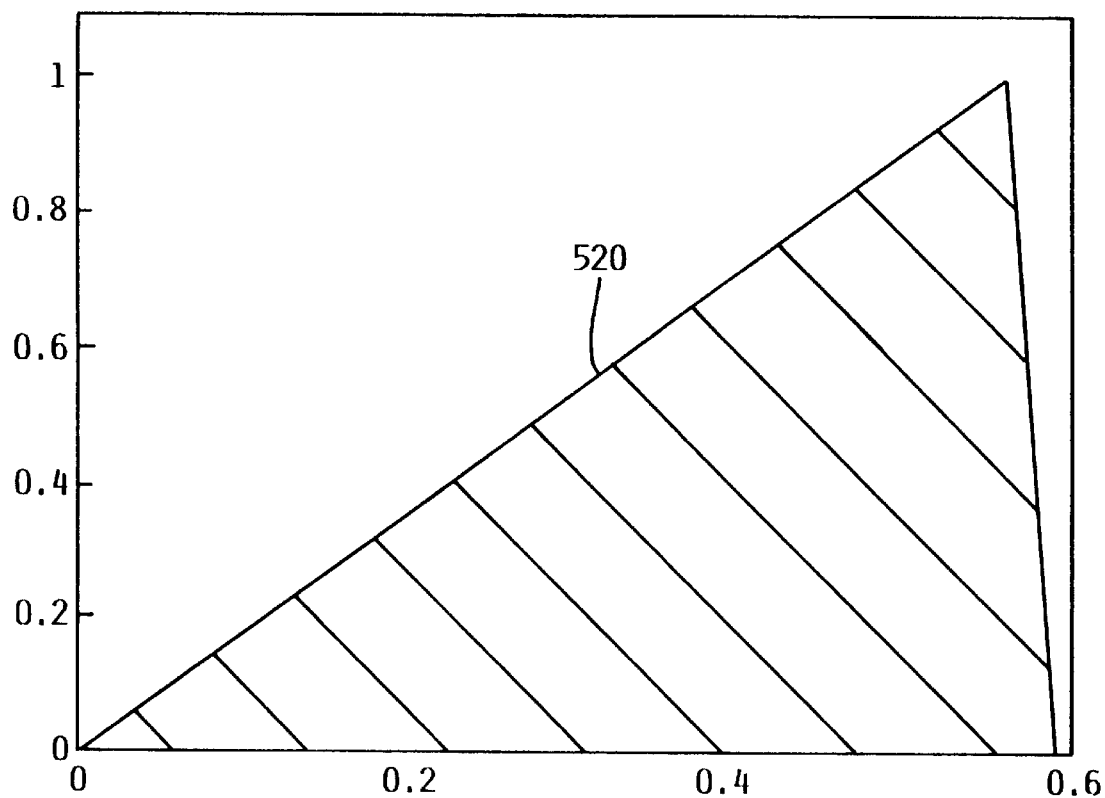
Figure 5C:
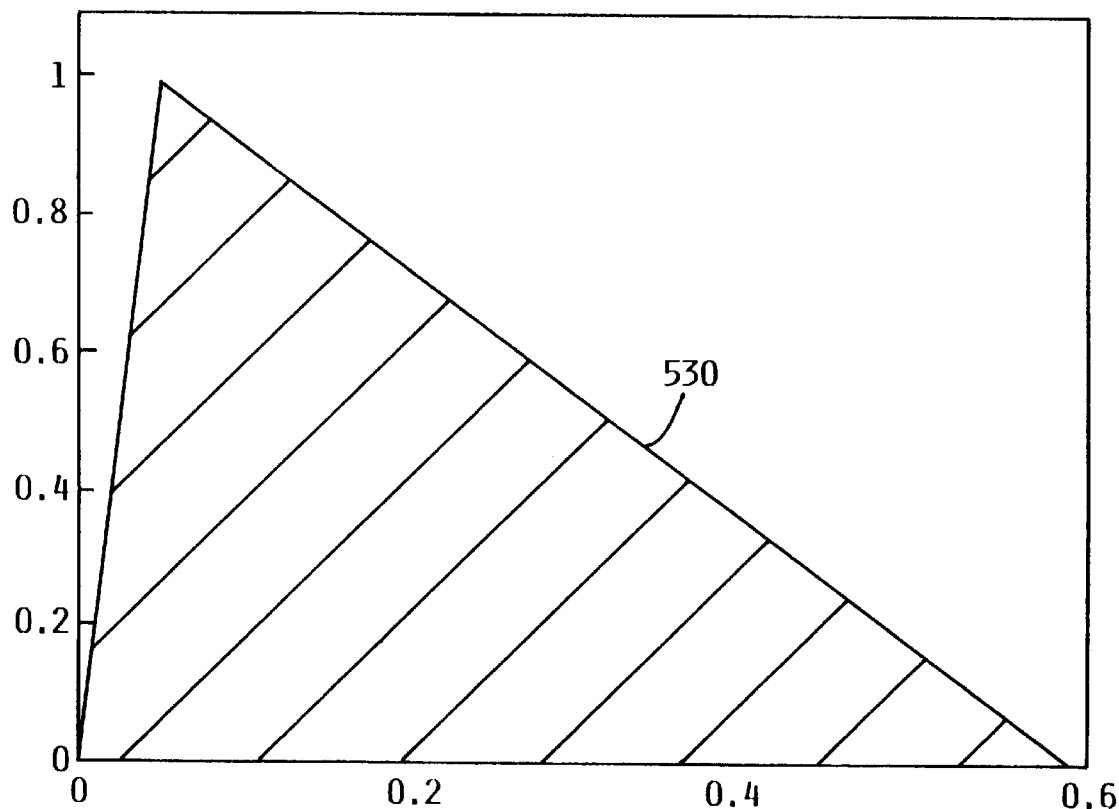

One particular source of offset in a PES transfer function results from an asymmetric read sensitivity profile in a read head of a data storage system transducer. A read sensitivity profile of MR read head is generally the sensitivity of the read head to magnetic flux over the width of the read head. The read sensitivity at a given location along the width of a read head is typically measured in volts per magnetic flux density. Computer models of exemplary read sensitivity profiles in the track width direction of read heads and their resultant PES transfer functions are illustrated in FIGS. 5A–5C and FIG. 6, respectively. Generally, each of the read sensitivity profiles 510, 520, and 530 of FIGS. 5A–5C are depicted as normalized profiles over the width of a read head. Read heads having widths of 0.6 of a track pitch were used for the modeling. The read head modeling widths are used herein for illustration and are not intended to limit the scope of the invention. The symmetric sensitivity profile 510 is typical of a conventional thin-film or ferrite heads. Read heads with MR elements, however, typically exhibit trapezoidal read sensitivity profiles that are asymmetrical in nature, such as profiles 520 and 530.

Figure 6:
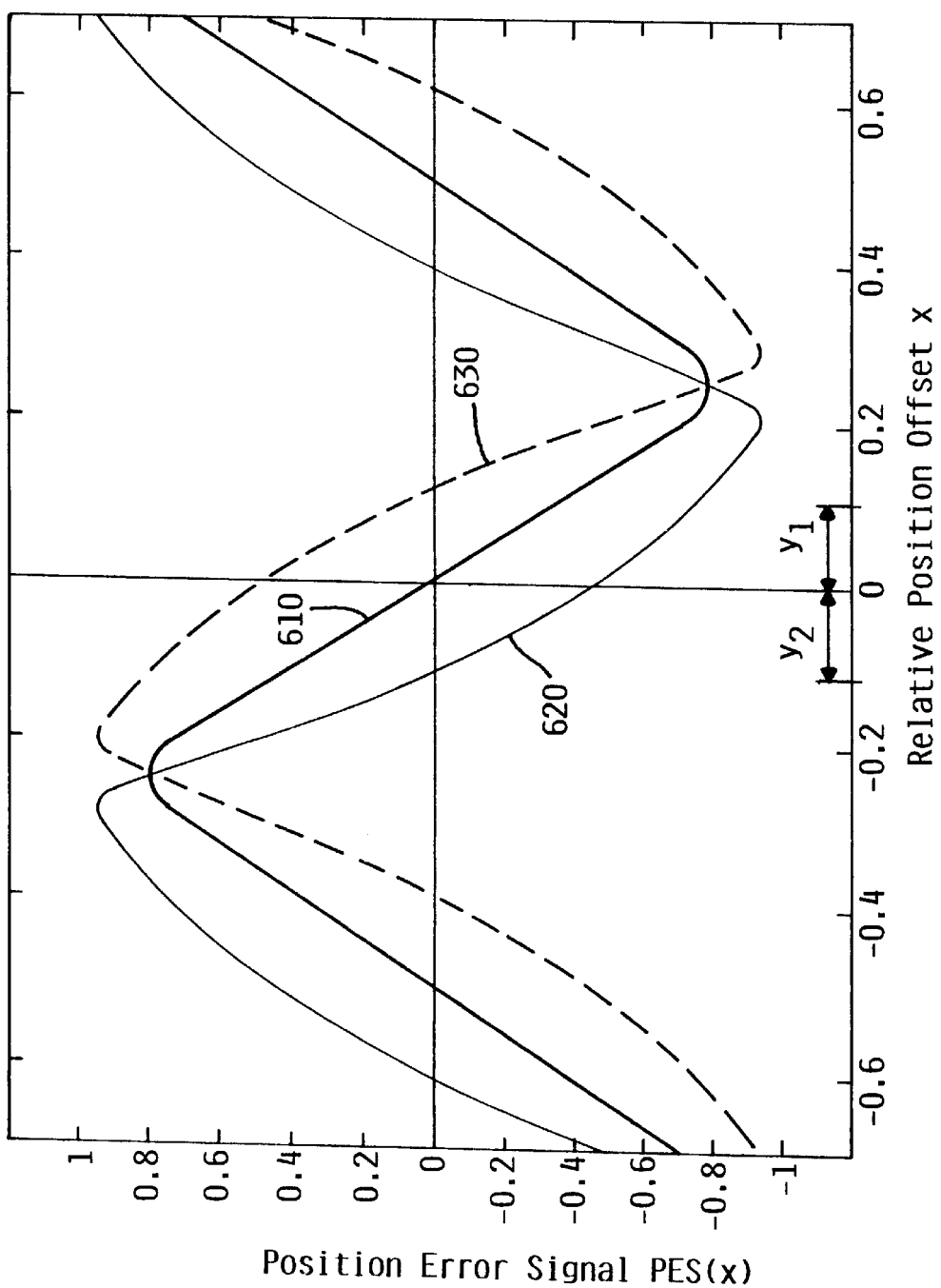
FIG. 6 illustrates PES transfer functions for the read sensitivity profiles of FIGS. 5A–5C.

FIG. 6 illustrates PES transfer functions 610, 620, and 630 as a function of servo sector centerline offset for each of the read sensitivity profiles 510, 520, and 530, respectively. The PES transfer functions were developed using computer modeling. Generally, the asymmetric read sensitivity profiles 520 and 530 produce offset PES transfer functions, while the symmetric sensitivity profile 510 produces a PES transfer function having no offset. For example, PES transfer function 530 illustrates an offset $y_1$ of about 10 percent of track width while PES transfer function 520 illustrates an offset $y_2$ of about –10 percent.

Offsets of PES transfer functions vary from head to head. More importantly, it has been determined that this offset can vary for a particular head over the life of the head. With MR read elements in particular, read sensitivity changes can, for example, result from MR read elements corrosion, MR read element impact with thermal asperities, head/disk electronic discharge, or electron migration in the MR read head element. Changes in read sensitivity profile over time cause changing offsets in the PES transfer function of a read head. These offsets can result in a problematic write-to-write and write-to-read track misregistration for a particular head in a disk stack.

While a PES transfer function for an asymmetric read head is generally nonlinearly related to servo sector centerline offset, it has been determined that the offset of a PES transfer function is substantially proportional to the median of the read sensitivity profile of the read head. The median $\overline{M}$ of a read sensitivity profile may be expressed by the relationship:

$$\int_0^{\overline{M}} s(x)dx = 0.5 \int_0^W s(x)dx \quad [2]$$

where W is the width of the read head, x is a point along the width of the read head, and s(x) is the read sensitivity at x. The offset Y of a PES transfer function is proportional to the distance between the physical center of a read head (W/2) and the median of the sensitivity profile of the read head ($\overline{M}$). This relationship may be expressed as:

$$Y = W/2 - \overline{M} \quad [3]$$

As noted above, the read sensitivity profile of a given head (and thus the offset of the head) may change over time. This change in offset $\Delta Y$ may be expressed as:

$$\Delta Y = Y_{t2} - Y_{t1} = \overline{M}_{t1} - \overline{M}_{t2} \quad [4]$$

where $Y_{t2}$ and $\overline{M}_{t2}$ and $Y_{t1}$ and $\overline{M}_{t1}$ are the offsets and corresponding medians at times $t_1$ and $t_2$, respectively.

Figure 7:
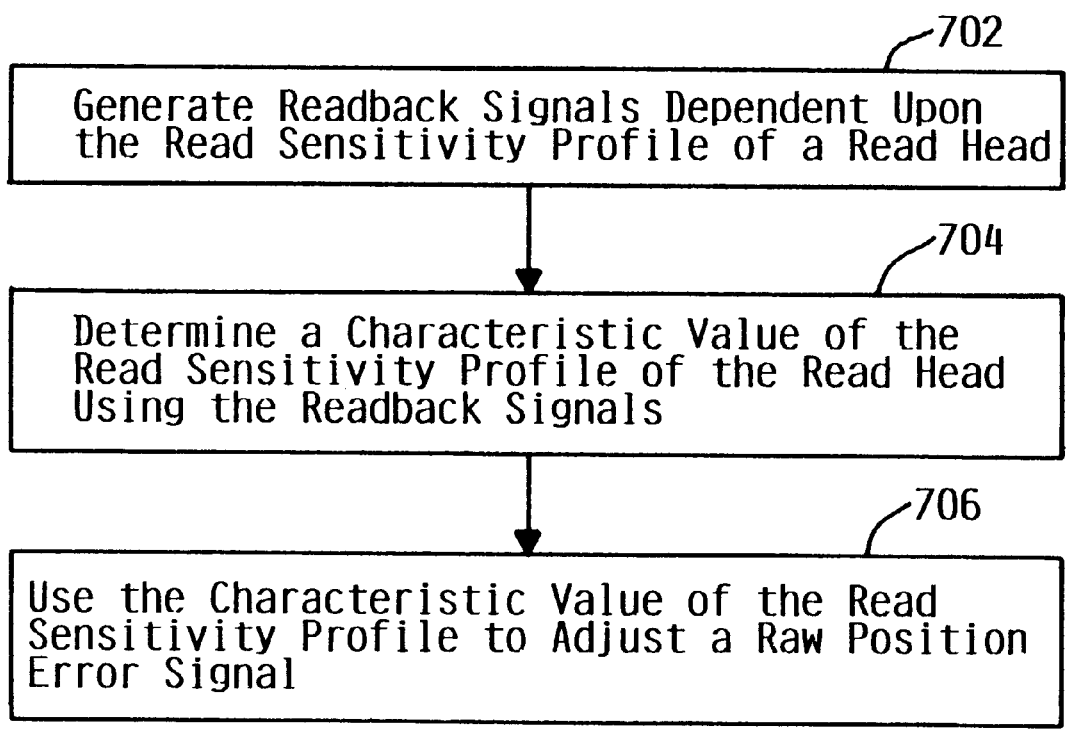
FIG. 7 is a flowchart illustrating an exemplary process in accordance with one embodiment of the present invention.

Turning now to FIG. 7, there is shown a flow chart which illustrates an exemplary process for correcting offsets in the PES transfer function of a read head. The process may be used for each read head in a data storage system. As illustrated at block 702, readback signals dependent upon the read sensitivity of a read head are generated. The readback sensitivity profile may, for example, be generated by moving the read head over a data track and generating readback signals at various locations of the read head over the data track. Details of an exemplary data track will be discussed below.

The readback signals are then used to estimate a characteristic value dependent on the read sensitivity profile of the read head, as illustrated at block 704. The characteristic value may be used to estimate changes in the median of the head's read sensitivity profile (and thus changes in head offset). The characteristic value may, for example, be determined using one or more data points from a profile developed from the readback signals. The invention is not limited to the particular profile developed. The profile may simply be a readback signal profile, e.g., a set of data points, each of which correspond to a readback signal magnitude at a particular location of the read head over the data track. In other embodiments, the profile may be a cumulative sum profile, e.g., a set of data points, each of which correspond to the cumulative sum of the readback signal magnitudes up to a particular location with respect to the data track. The latter embodiment will be discussed more fully below.

The characteristic value of the read sensitivity profile of the read head is then used to adjust the PES signals generated using the particular read head, as illustrated at Block 706. For example, the difference between a characteristic value of the read sensitivity profile of a read head at the time when data tracks were written and a characteristic value of the read sensitivity profile of the read head at a later time may be used to determine the offset change between the PES transfer functions of the read head at the two times. The offset change may be used to adjust the PES signals of the read head so that the head is properly positioned over the written track.

Figure 8:
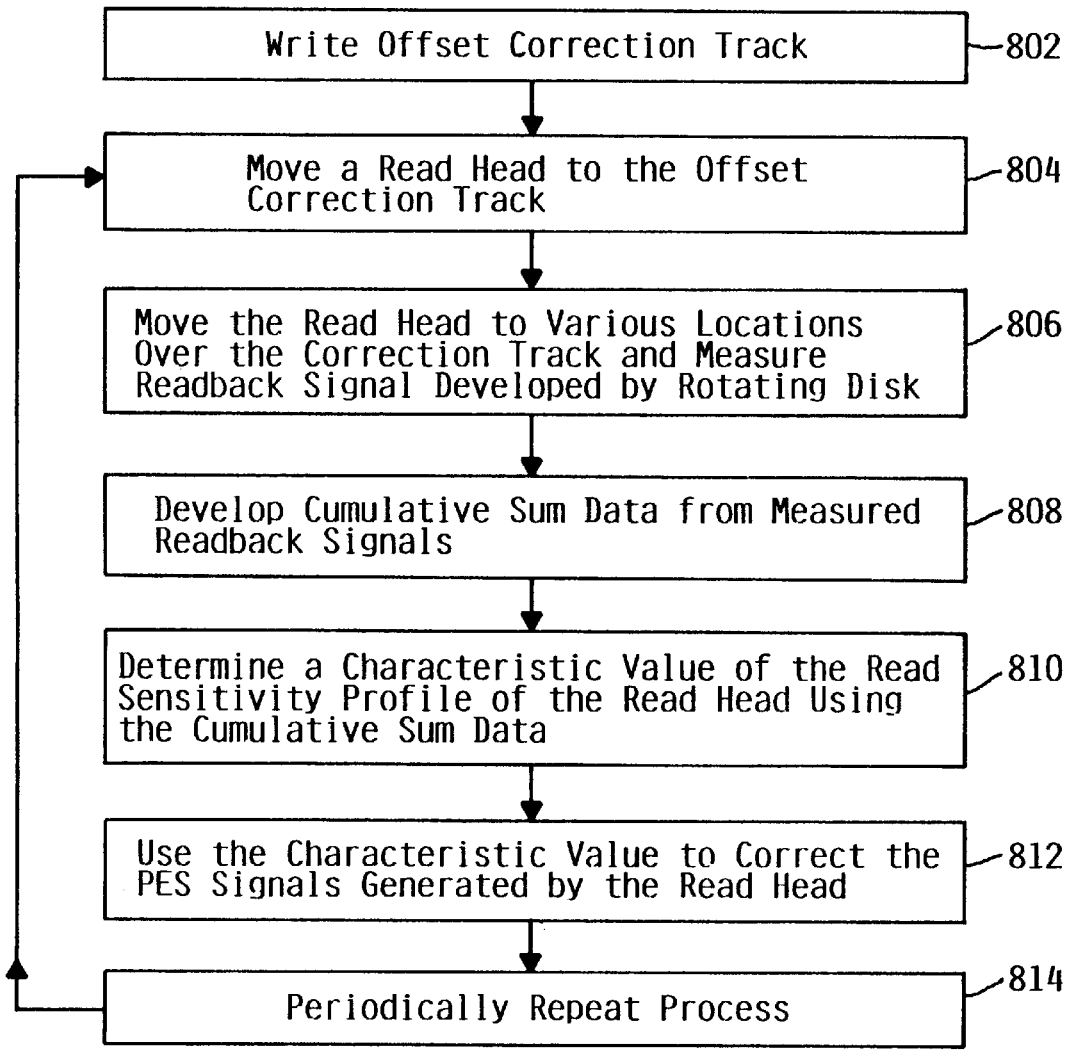
FIG. 8 is a flow chart illustrating another exemplary process in accordance with another embodiment of the invention.

Turning now to FIG. 8, there is illustrated another exemplary process for correcting for offset in a PES transfer function in accordance with yet another embodiment of the invention. Generally the embodiment of FIG. 8 provides an in-situ process for determining the offset change in a PES transfer function of a read head over time. Using the process, the offset change in the PES transfer function for each read head in a data storage system between the time at which data tracks were written and a later time may be determined and the PES function adjusted for the offset change. The Blocks 802–814 of FIG. 8 will be discussed with reference to FIGS. 9–12. FIG. 8 will be discussed with reference to a single read head, however it should be appreciated that in systems employing multiple read heads, the process of FIG. 8 may be used with each read head.

Figure 9:
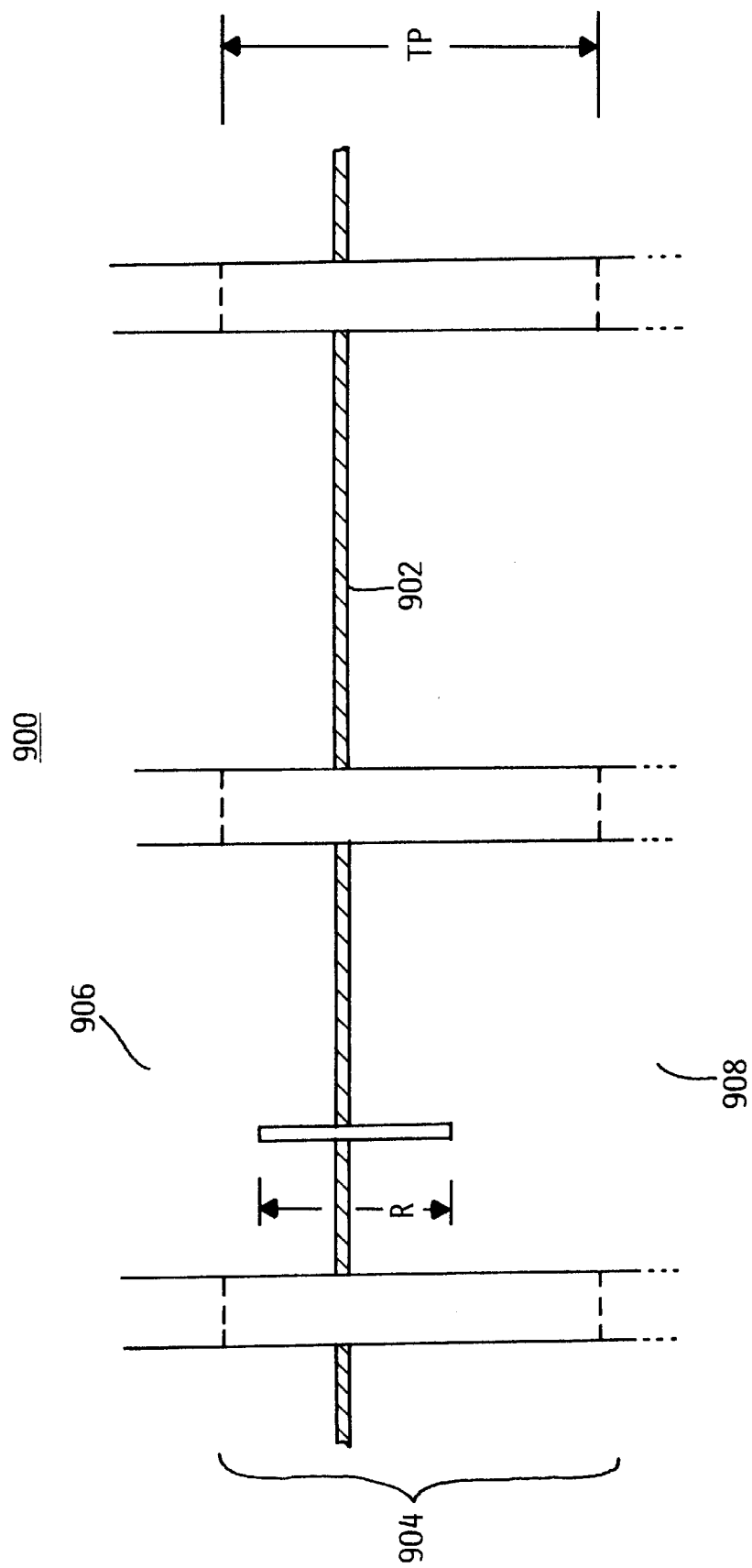
FIG. 9 is an exemplary offset correction track in accordance with one embodiment of the invention.

Block 802 represents writing an offset correction track on a disk associated with a read head. Generally, the correction track is written in an offset correction zone, using, for example, an external positioning system. The offset correction zone may be, for example, in a protected area of the disk, such as an area for data channel calibration measurements, at the inner diameter and/or outer diameter of the disk. The offset correction track may, for example, be a micro-track. The centerline of the micro-track may be aligned with or offset from a servo sector centerline. An exemplary offset correction zone 900 including a micro-track 902 is illustrated in FIG. 9. The exemplary micro-track 902 is formed within a normal track 904. The offset correction zone 900 may further include empty tracks 906 and 908 adjacent track 904. The micro-track 902 may, for example, be generated at the time of manufacture using servo track write (STW) by writing a track and offsetting the write head and erasing portions of the track, as is well known in the art.

The micro-track 902 may also be written in-situ. Suitable widths of the offset correction track include about 5–10% of track pitch or about 8–15% of read head width, for example.

The read head is moved to the offset correction track, as illustrated at Block 804. The read head is then moved across the offset correction track and readback signal amplitudes are measured at various locations with respect to the offset correction track as illustrated at Block 806. Generally, this involves moving the read head to a reference position (e.g., a predefined forced PES offset) under control of the servo control system, applying known, forced PES offsets to the read head, and measuring the readback signal amplitude at each forced offset.

Figure 10A:
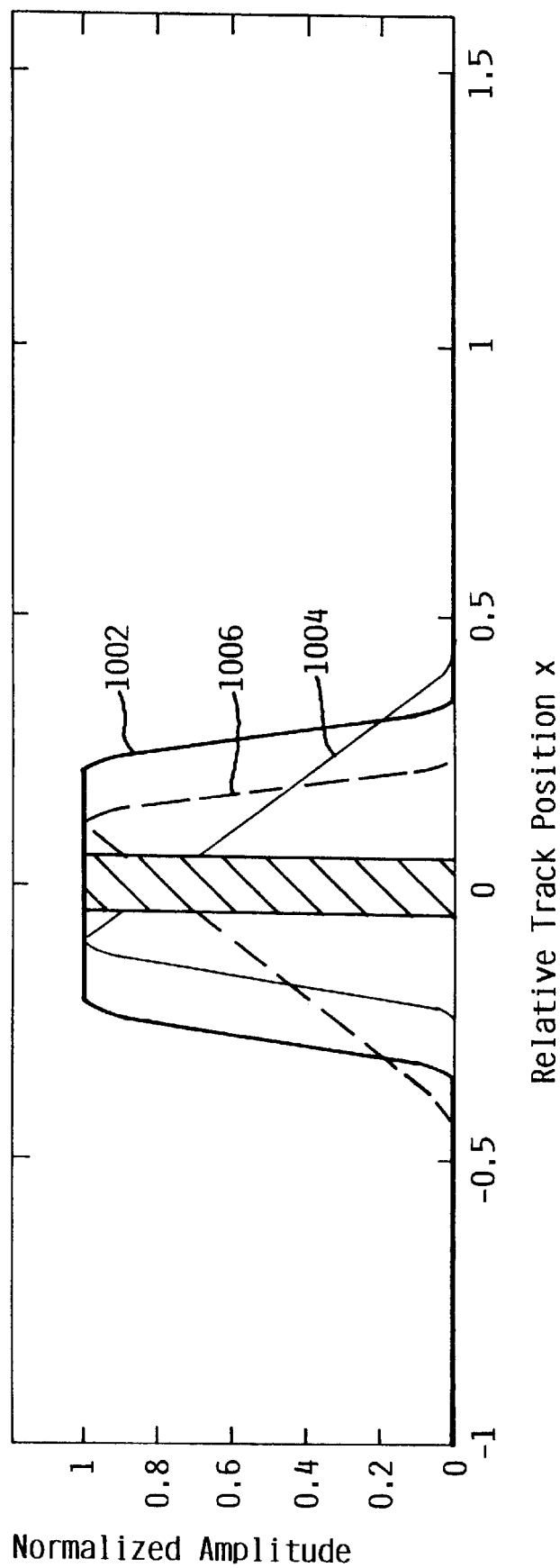
FIG. 10 illustrates exemplary plots of readback signal responses to a micro-track for read heads having the read sensitivity profiles shown in FIGS. 5A–5C.
Figure 10B:
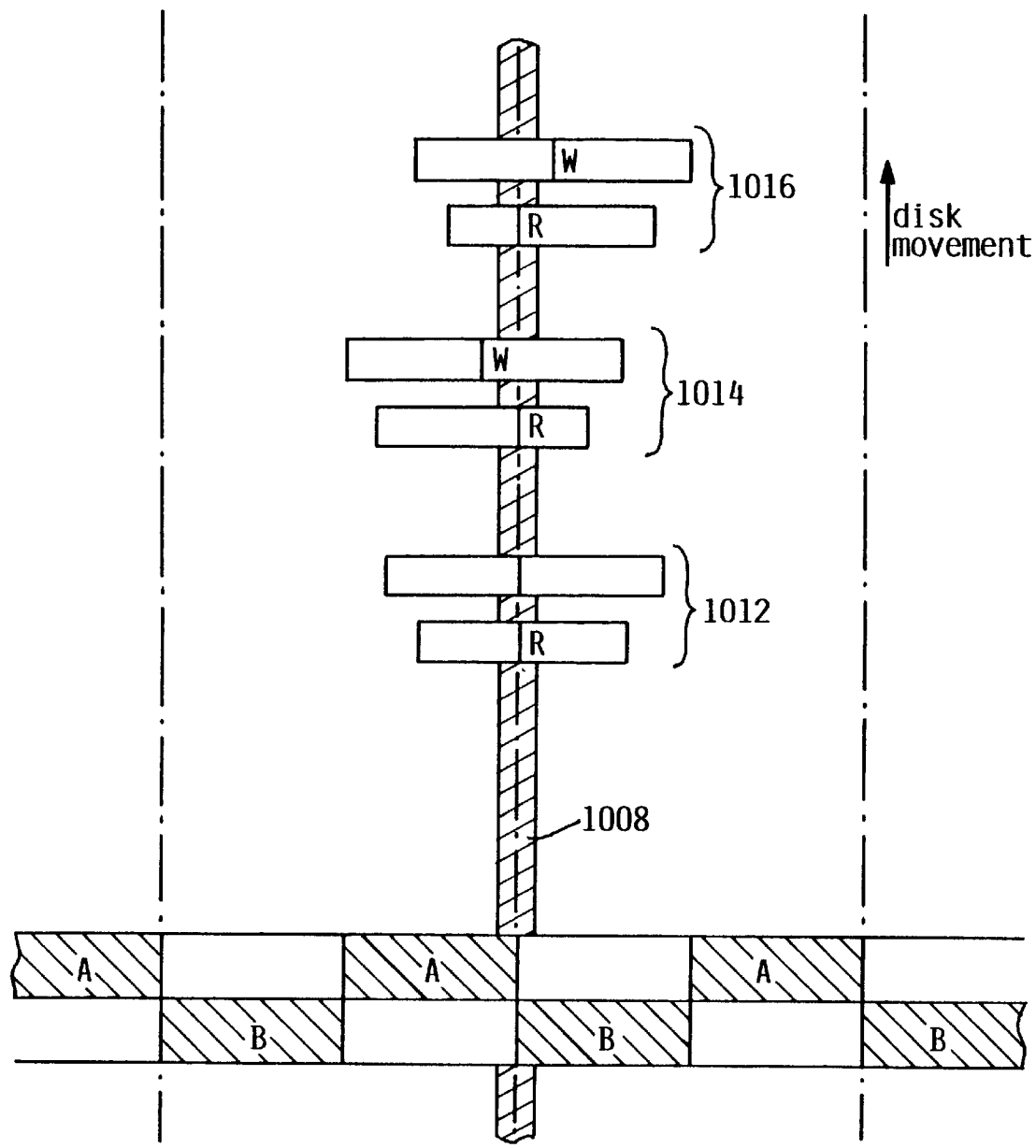

FIG. 10 illustrates readback amplitude signals 1002, 1004, and 1006 as a function of offset relative to the centerline of a micro-track 1008. Readback amplitude signal 1002 is associated with a read/write head 1012 having the read sensitivity profile 510 of FIG. 5A. Readback amplitude signal 1004 is associated with a read/write head 1014 having the read sensitivity profile 520 of FIG. 5B. Readback amplitude signal 1006 is associated with a read/write head 1016 having read sensitivity profile 530 of FIG. 5C. The readback amplitude signals 1002–1006 were developed using computer modeling techniques. Each of the read/write heads 1012–1016 illustrated in FIG. 10 include a separate read head and write head as illustrated.

A cumulative sum data set is generated from the measured readback amplitude signals, as illustrated at Block 908. A cumulative sum data set may, for example, be developed from the relationship:

$$Sum(Z_i) = \sum_{n=0}^{i} e(Z_n) \qquad [5]$$

where $Z_i$ is the PES offset at a number i of forced PES offsets from a reference offset $Z_0$, $e(Z_n)$ is the readback signal amplitude at a PES offset $Z_n$, and Sum $(Z_i)$ is the cumulative sum of the readback amplitude signals from the reference PES offset $Z_0$ to PES offset $Z_i$. The readback amplitude signal e $(Z_n)$ may, for example, be the per track or per sector average peak-to-peak readback signal amplitude without automatic gain control at the particular PES offset $Z_n$. Each data block of the cumulative sum data set generally includes the value of Sum($Z_n$) and the corresponding PES offset $Z_n$.

Figure 11:
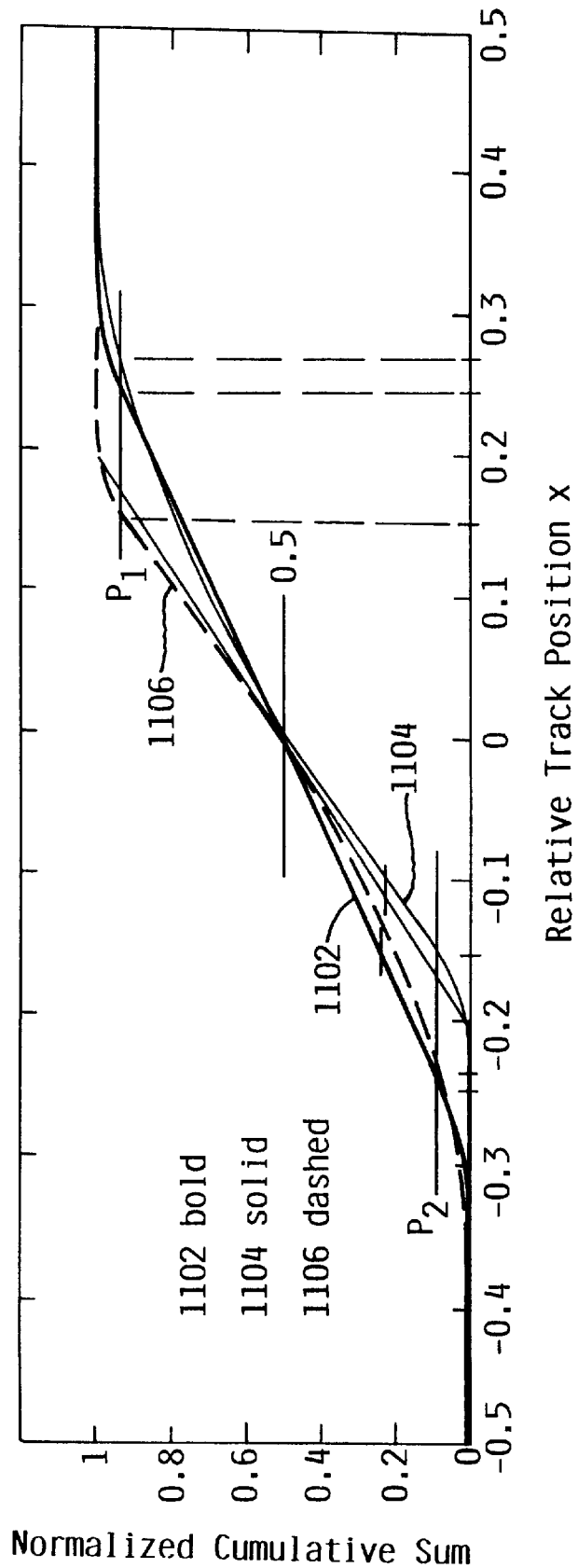
FIG. 11 illustrates exemplary plots of cumulative sum data sets for the read sensitivity profiles shown in FIGS. 5A–5C.

FIG. 11 illustrates plots 1102, 1104, and 1106 of cumulative sum data sets relative to the centerline of the micro-track 1008 of FIG. 10 for the read heads 1012–1016 of FIG. 10. The plots 1102–1106 are illustrated with reference to the micro-track centerline to provide a common reference between the various Figures herein. It is noted however that, in operation, each cumulative sum data set generally includes the sums Sum $(Z_n)$ for each forced PES offset $Z_n$, rather than a particular position relative to the micro-track. It is further noted that these plots were developed with computer modeling techniques.

A characteristic value dependent upon the read sensitivity profile of the read head is estimated from the cumulative sum data, as indicated at Block 810. The characteristic value may be estimated using one or more data blocks of the cumulative sum data. As illustrated in FIG. 11, a characteristic value may be determined by comparing two data points from a cumulative sum data set. In one exemplary embodiment, a characteristic value approximating the median of a read sensitivity of the read head is determined from two data points using the relationship:

$$CV = \frac{Z(P1) + Z(P2)}{P1 - P2} \quad [6]$$

where CV is the characteristic value, P1 and P2 are percentages of a maximum value of the cumulative sum data set, and Z(P1) and Z(P2) are the PES offsets at the percentages P1 and P2 respectively. Typically, one of the percentages P1 or P2 is below the 50th percentile and the other above the 50th percentile. In one particular embodiment, P1 is about 95% and P2 is about 5%.

The characteristic value may be used to adjust PES signals generated using the read head to reduce the offset of the read head relative to the centerline of written tracks, as illustrated at block 812. For example, a characteristic value ($CV_o$) of a read head at a time when data tracks are written on a disk, e.g., at manufacturing time, may be measured and stored. The data tracks may be written without any offset correction to the PES transfer function of the read head, and the characteristic value $CV_o$ may be used as a reference value to determine changes in the PES transfer function over time. In particular, an offset change ΔOFF of the read head may be determined from the following relationship:

$$\Delta OFF = CV_t - CV_o \quad [7]$$

where $CV_t$ is the characteristic value of the read head sensitivity profile at time t. The ΔOFF determined from equation [7] is, for example, one method of estimating the actual change offset (ΔY as from Equation [4]. The offset change ΔOFF may then be used to correct raw PES signals using the relationship:

$$PES_{cor} = PES_{raw} - \alpha \Delta OFF \quad [8]$$

where $PES_{cor}$ is a corrected PES signal, $PES_{raw}$ is the uncorrected PES signal, and is a a correction coefficient. An offset correction coefficient a of about 1 is suitable for many applications.

Finally, as illustrated in block 814, the process of correcting for offset in a PES transfer function of a read head may be periodically repeated to account for changes in the PES transfer function offset due to variations in the read sensitivity profile of the read head over time. For example, the offset correction process may be repeated when the data storage device is powered-on and/or at periodical intervals, such as every 30 minutes, during operation.

Using the above process, changes in the offset of a PES transfer function over time may be determined and the PES signals of the head corrected for the changes. This reduces write-to-read and write-to-write track misregistration. Moreover, the characteristics values or offset changes ΔOFF for each read head may be stored in order to store a chronological history of the change in the read sensitivity profile of a read head over time. The stored characteristic values or offset changes may be used, for example, to identify any significant physical changes in the read head. This may be done, for example, by comparing the rate of change between the characteristic values or offset changes of a particular head.

Table 1 below illustrates results of the above process for a read heads i (i=1,2,3) having the read sensitivity profiles 510, 520, and 530 of FIG. 5, respectively. The values in Columns 2 and 3 are the track offsets relative to the micro-track centerline of the read head at the 5 and 95 percentiles. Again, it is noted that the centerline of the micro-track has been used as a reference point to facilitate cross-reference between the Tables and Figures herein. In operation, the forced PES offset for the particular head at the 5 and 95 percentiles would typically be used. Column 3 and 4 illustrate the estimated read sensitivity profile medians $M_t$ and the actual read sensitivity profile medians $\overline{M}_t$ for the read heads.

TABLE 1

| Head i | $X_i$ (Z(5%)) | $X_i$ (Z(95%)) | $M_t$ | $\overline{M}_t$ |
|---|---|---|---|---|
| 1 | −0.2570 | 0.2560 | −0.0010 | 0.0000 |
| 2 | −0.1671 | 0.2829 | 0.1286 | 0.1099 |
| 3 | −0.1667 | 0.2683 | 0.1129 | 0.0873 |

Figure 12:
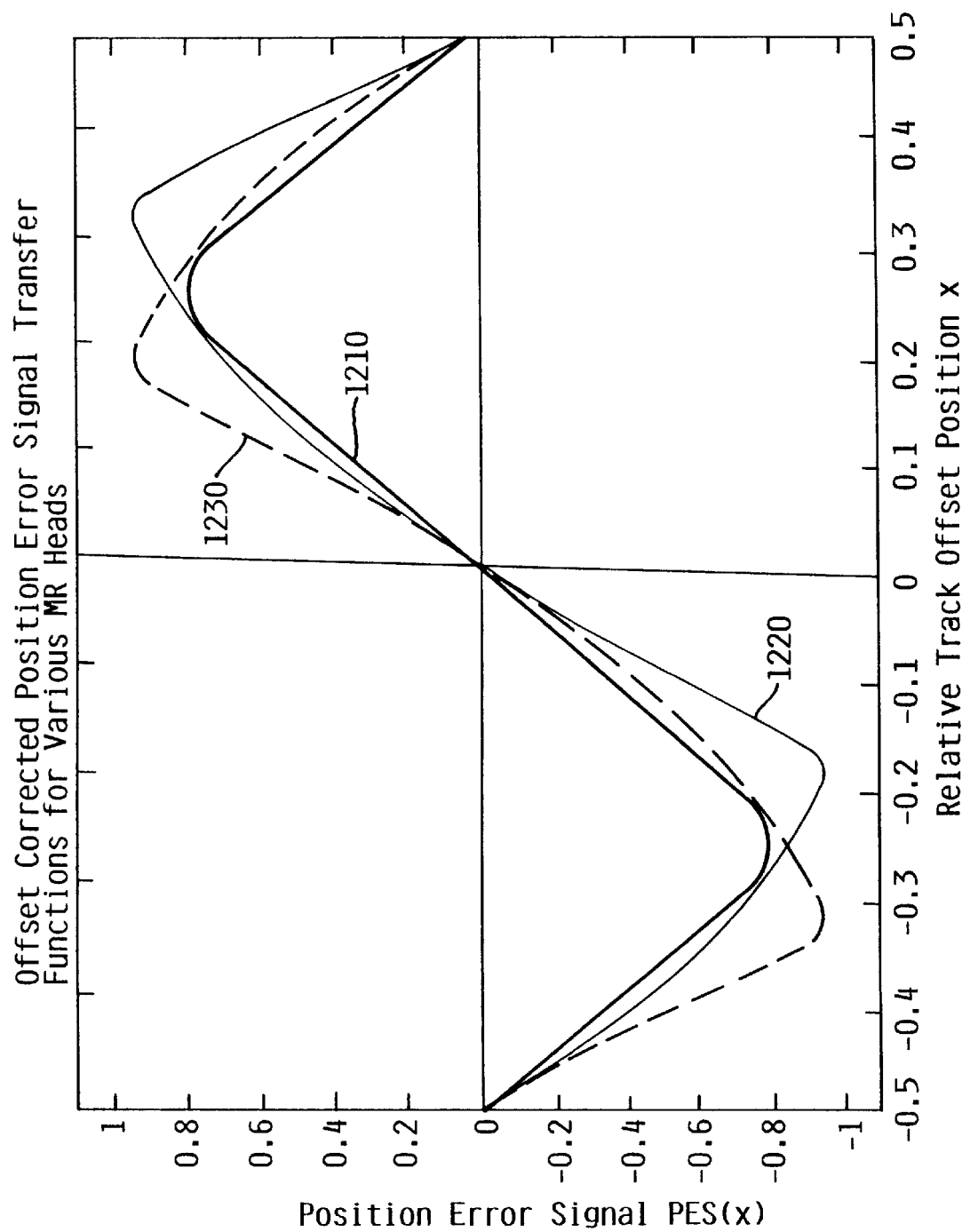
FIG. 12 illustrates corrected PES transfer functions for the read sensitivity profiles of FIGS. 5A–5C.

FIG. 12 is a computer generated plot of corrected PES transfer function 1210, 1220, and 1230 for read heads having read sensitivity profiles 510, 520, and 530 respectively. The PES transfer functions 1210, 1220, and 1230 have been corrected using the relationship:

$$PES_{cor} = PES_{old} - (W/2 - \bar{M}_t) \quad [9]$$

where $PES_{cor}$ is an corrected PES transfer functions 1210–1230, $PES_{old}$ is an uncorrected PES transfer function 610–630, W is the width of the read head (for example, 0.6 of track pitch) and $\overline{M}_t$ is the estimated median for the read head from Table 1. A comparison of FIG. 12 (corrected PES transfer functions) to FIG. 6 (uncorrected PES transfer functions) illustrates the benefits of the invention.

Figure 13:
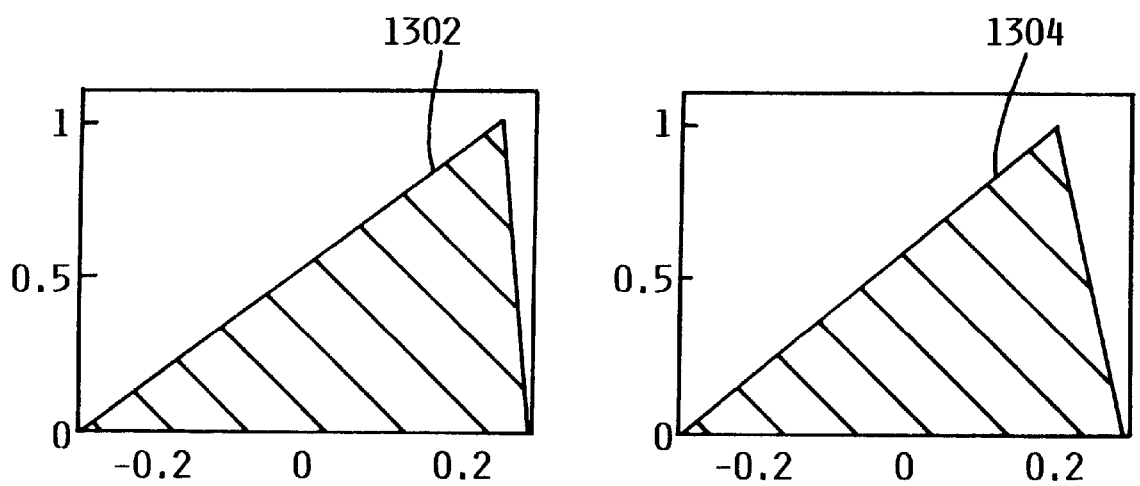
FIG. 13 illustrates exemplary read sensitivity profiles of a read head at two different times.
Figure 14:
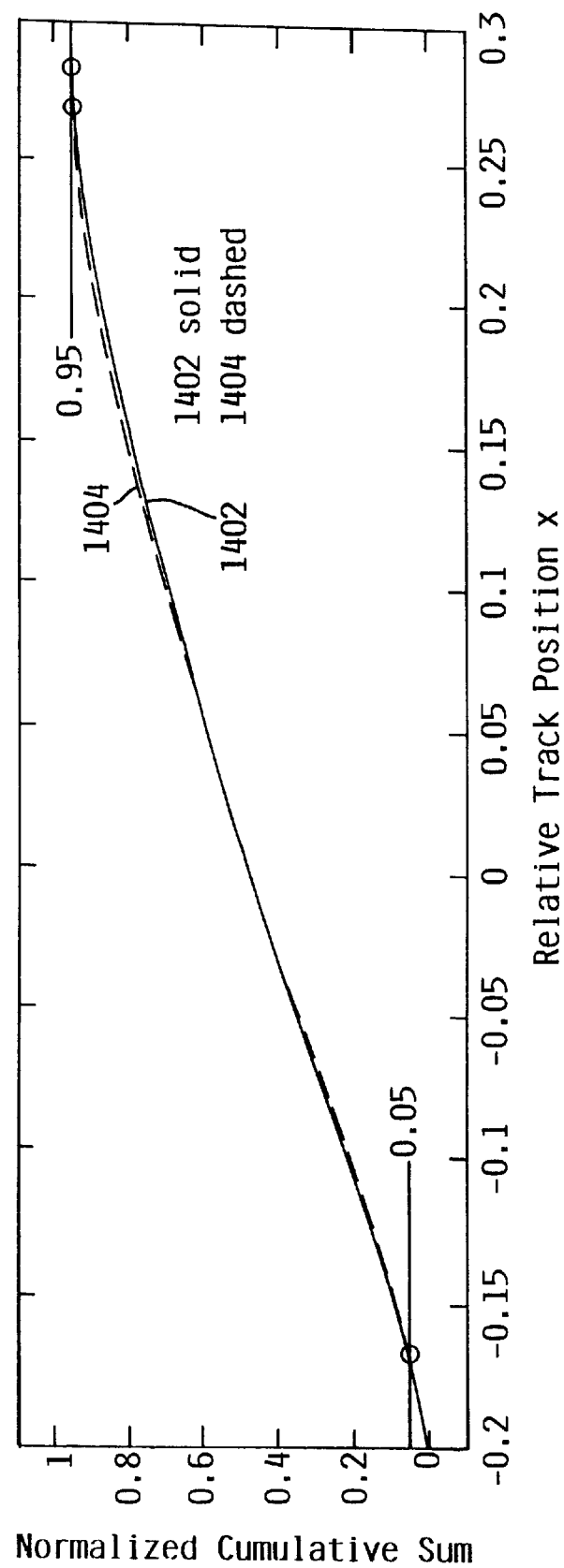
FIG. 14 illustrates an exemplary plot of a cumulative sum data set for the read head of FIG. 13 at the two times.

With reference to Table 2 below and FIGS. 13–15, use of the above system will be illustrated for a read head having a read sensitivity profile which changes between two times. FIG. 13 illustrates two computer generated read sensitivity profiles 1302 and 1304 which represent the read sensitivity profile of a read head at a first time $t_0$ and a second time $t_1$. For example, profile 1302 may represent the read sensitivity of the read head at manufacturing time and profile 1304 may represent the read sensitivity profile when the data storage system is first powered up. The actual medians $\overline{M}_t$ and change between the medians $\Delta \overline{M}_t$ for the read sensitivity profiles 1302 and 1304 are illustrated in Columns 4 and 5 of Table 2 below. It should be appreciated from equation [4] above that the change in the medians $\Delta \overline{M}_t$ represents the actual offset change in the PES transfer functions of the read head between time $t_0$ and time $t_1$.

TABLE 2

| timet | $X_t$ ($Z_t$ (5%)) | $X_t$ ($Z_t$ (95%)) | $\overline{M}_t$ | $\Delta \overline{M}_t$ | $CV_t$ | ΔOFF | Error |
|---|---|---|---|---|---|---|---|
| 0 | −0.1671 | 0.2829 | 0.4286 | — | 0.4099 | — | — |
| 1 | −0.1667 | 0.2683 | 0.4129 | −0.0157 | 0.3873 | −0.0226 | 0.7% |

Measurement of the offset change of PES transfer functions of the read head $t_0$ and $t_1$ using the above process will be illustrated with reference to FIG. 14 and Table 2. FIG. 14 illustrates computer generated plots 1402 and 1404 of the cumulative sum data sets for the read head at time $t_0$ and time $t_1$, respectively. The cumulative sum plots 1402, 1404 may be generated by moving the read head over an offset correction track, such as a micro-track, as discussed above. The cumulative sum plots 1402 and 1404 are referenced to the centerline of a micro-track. To determine the characteristic values for the read head at time $t_0$ and time $t_1$, the PES offsets for the 5 percentile and 95 percentile indices of the cumulative sum plots are determined and a characteristic value is developed using equations [5] and [6] above. As the cumulative sum plots 1402 and 1404 have been referenced to the centerline of the correction track, the head position relative to the correction track centerline has been substituted for the PES offsets at the 5% and 95% indices in equations [5] and [6].

The head position relative to the micro-track for the 5% and 95% indices are shown in Columns 2 and 3 of Table 2. The characteristic values $CV_t$ (generated by substituting $X_t(Z_t(5\%))$ and $X_t(Z_t(95\%))$ for $Z_t(5\%)$ and $Z_t(95\%)$ in equation [5])0 and the change between the characteristic values $\Delta OFF$ are shown in columns 6 and 7 of Table 2. The change &OFF may be used to correct for the offset change in the PES transfer function of the read head between the time $t_0$ and time $t_1$, using equation [8] above. The offset change $\Delta OFF$ differs from the actual change in offset $\Delta \overline{M}_t$ by 0.7% of one track pitch as illustrated in Column 8 of Table 2.

Figure 15:
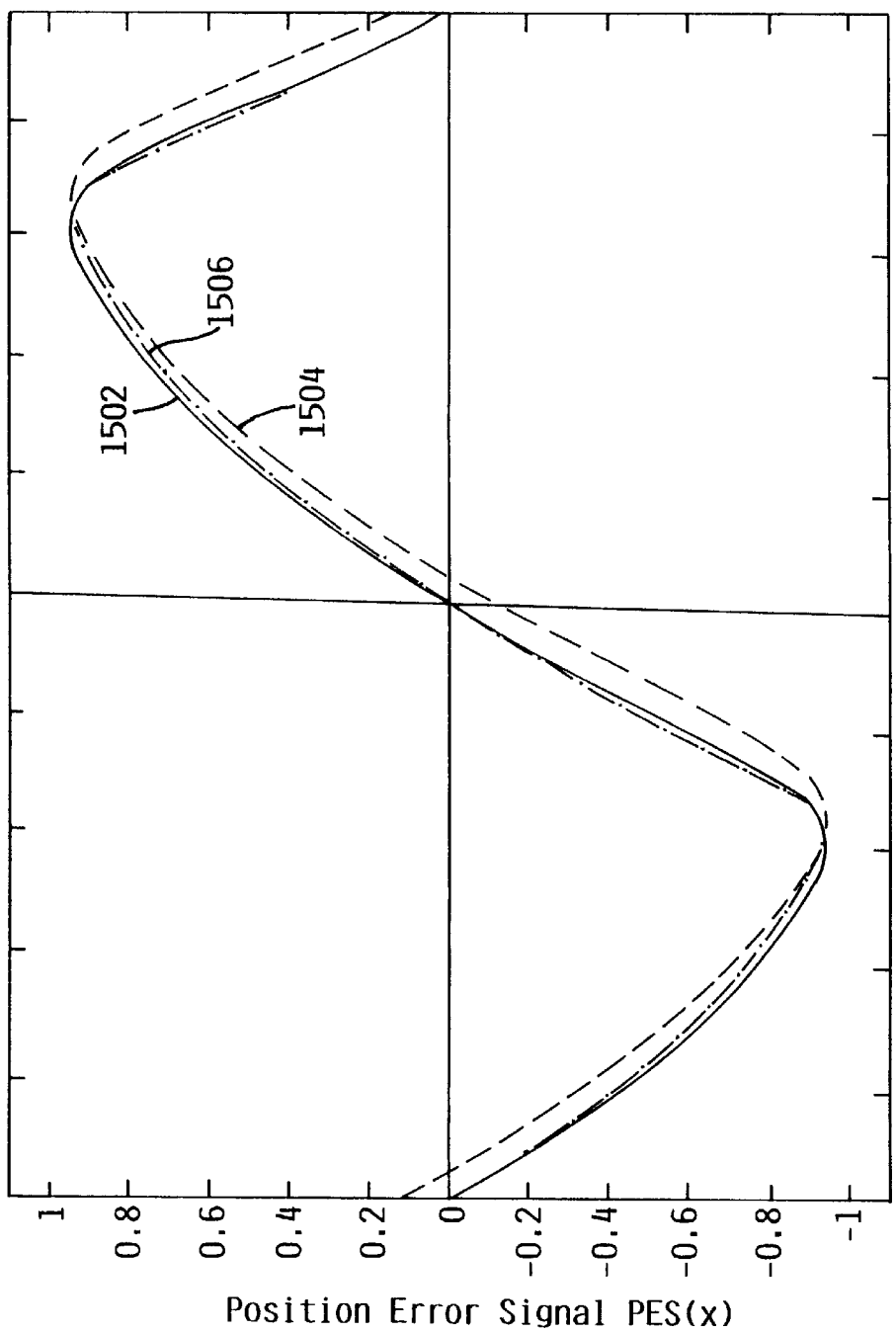
FIG. 15 illustrates corrected and uncorrected PES transfer functions for the read head of FIG. 13.

FIG. 15 illustrates corrected and uncorrected PES transfer functions for the read head at time $t_0$ and time $t_1$. In particular, PES transfer function 1502 represents PES transfer function for the read head at time $t_0$ relative to track position. The PES transfer function 1502 may be corrected for offset at manufacturing time using the external positioning system. PES transfer function 1504 represents an uncorrected PES transfer function for the read head at time $t_1$ and PES transfer function 1506 represents an offset corrected PES transfer function for the read head at time $t_1$. It can be seen from the FIG. 15 that the above process can correct for offset changes in a PES transfer for a given head over time.

Figure 16:
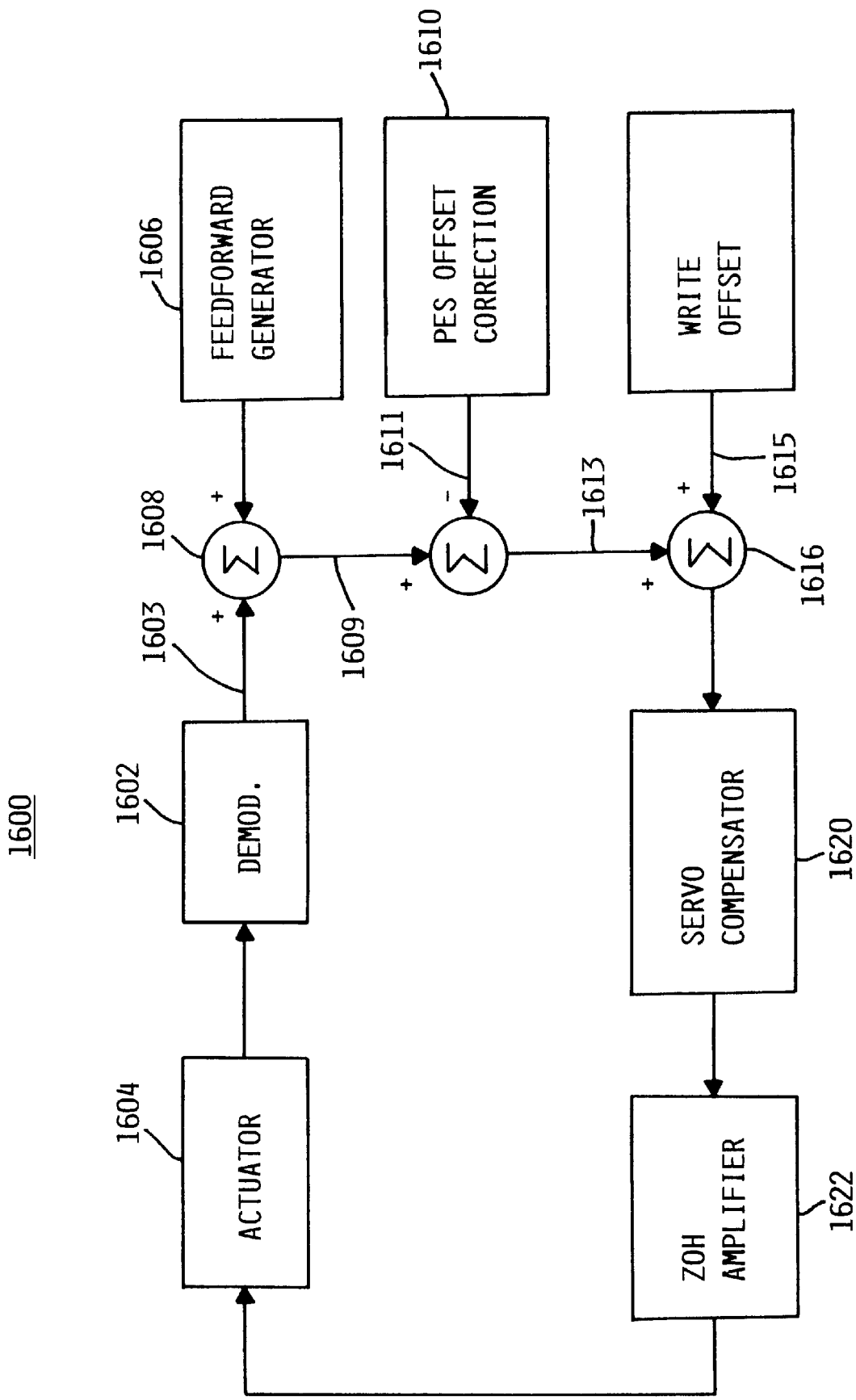
FIG. 16 is a block diagram illustrating an exemplary servo control system in accordance with one embodiment of the present invention.

Turning now to FIG. 16, there is illustrated an exemplary servo control system in accordance with one embodiment the present invention. The servo control system 1600 generally includes a servo demodulator 1602 which receives readback signals from the read head on an actuator 1604 and develops a position error signal 1603. The position error signal 1603 is then adjusted for disk eccentricity using the feed-forward generator 1606 and summer 1608, in a manner well-known in the art. An uncorrected PES signal 1609 is output from summer 1608. An offset correction value 1611 is provided from an offset correction system 1610 and subtracted from uncorrected PES signal 1609 to generate an offset corrected PES signal ($\text{PES}_{cor}$) 1613. The offset correction value 1611 may, for example, be determined by equation [7], as discussed above. $\text{PES}_{cor}$ signal 1613 is then adjusted with a write offset signal 1615, if a write operation is being performed, by summer 1616. Summer 1616 output is provided to a servo compensator 1620 and zero order hold amplifier 1622 which appropriately supply a current to the actuator to move the transducer.

Figure 17:
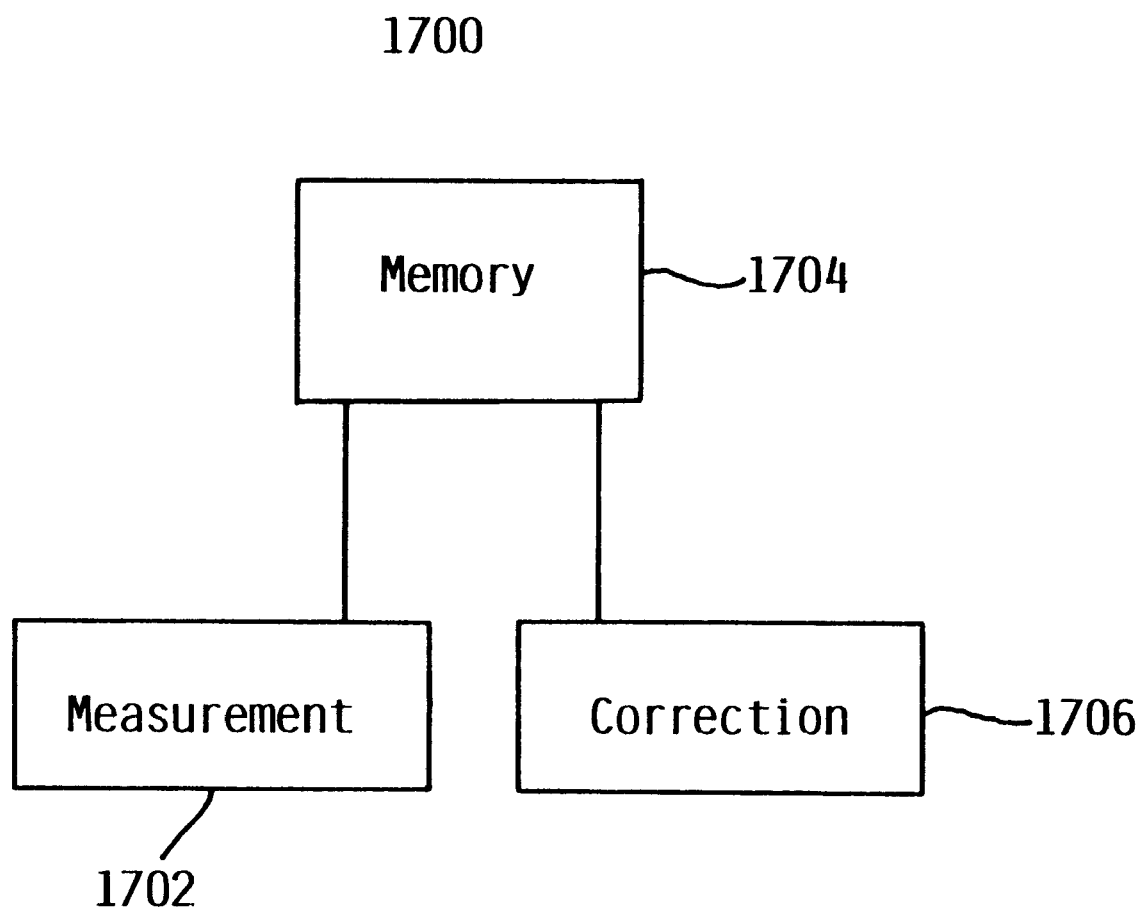
FIG. 17 illustrates an exemplary offset correction component for a servo control system in accordance with one embodiment of the invention.

FIG. 17 illustrates an exemplary offset correction system for a servo control system in accordance with the present invention. The exemplary offset correction component 1700 generally includes an offset measurement component 1702, an offset correction component 1704, and a memory arrangement 1706. The offset measurement component 1702 generally interfaces with the servo control system to periodically move a read head to an offset correction track and estimate an offset correction value in the manner as discussed above. The offset correction value is stored in the memory arrangement 1706. The offset correction component 1704 retrieves current offset correction values from the memory arrangement 1706 and provides the values to the servo control system to adjust uncorrected PES signals to account for the offset changes during read and write operations.

As noted above, the present invention is applicable to a wide variety read heads and servo control systems. Accordingly, the present invention should not be considered limited to the particular examples described above, but rather should be understood to cover all aspects of the invention as fairly set out in the attached claims. Various modifications as well as numerous equivalent structures to which the present invention may be applicable will be readily apparent to those of skill in the art to which the present invention is directed upon review of the present specification. The claims are intended to cover such modifications and structures.

What is claimed is:

1. A method of correcting for offset in a raw position error signal, comprising:

generating readback signals dependent upon an asymmetric read sensitivity profile of a read head by moving the read head over a correction track, the asymmetric read sensitivity profile of the read head characterized by a read sensitivity that varies asymmetrically over a width of the read head;

determining a characteristic value of the asymmetric read sensitivity profile using the readback signals;

generating the raw position error signal using the read head; and using the characteristic value of the asymmetric read sensitivity profile to adjust the raw position error signal.

2. The method of claim 1, wherein generating readback signals includes:

moving the read head to a plurality of locations with respect to the correction track on a disk; and measuring a readback signal at each location.

3. The method of claim 2, wherein moving the read head includes applying an incremental offset to the raw PES signal.

4. The method of claim 3, wherein the incremental offset to the raw PES signal corresponds to a distance of about of about 2% of the width of the read head.

5. The method of claim 3, wherein determining the characteristic value includes:

developing cumulative sum data; and using the cumulative data to determine the characteristic value.

6. The method of claim 5, wherein the cumulative sum data is developed using the relationship:

$$Sum(Z_i) = \sum_{n=0}^{i} e(Z_n)$$

where $Z_i$ is a PES offset at a number i of forced PES offsets from a reference offset $Z_0$, $e(Z_n)$ is a readback signal magnitude at a PES offset $Z_n$, and Sum $(Z_i)$ is a cumulative sum of the readback signal magnitudes from the reference PES offset $Z_0$ to the PES offset $Z_i$.

7. The method of claim 6, wherein the characteristic value is determined from the relationship:

$$CV = \frac{Z(P1) + Z(P2)}{P1 - P2}$$

where CV is the characteristic value, P1 and P2 are percentages of a maximum value of the cumulative sum data, Z(P1) and Z(P2) are PES offsets at the percentages P1 and P2 respectively.

8. The method of claim 7, wherein P1 is about 95% and P2 is about 5%.

9. The method of claim 7, wherein using the characteristic value to adjust the raw position error signal includes generating an offset correction value $\Delta$OFF according to the relationship:

$$\Delta OFF = CV_t - CV_0$$

where $CV_t$ is a characteristic value at a time t and $CV_o$ is a characteristic value at a time $t_o$.

10. The method of claim 9, wherein using the characteristic value includes generating a corrected PES signal according to the relationship:

$$PES_{cor} = PES_{raw} - \alpha \Delta OFF$$

where $PES_{cor}$ is the corrected PES signal, $PES_{raw}$ is the raw PES signal, and $\alpha$ is a correction coefficient.

11. The method of claim 10, wherein $\alpha$ is about 1.

12. The method of claim 1, further including writing the correction track using an external positioning system.

13. The method of claim 1, further including writing the correction track using an in-situ positioning system.

14. The method of claim 1, wherein the correction track comprises a micro-track.

15. The method of claim 1, wherein generating the raw position error signal includes:
reading servo information from a disk; and
using the servo information to generate the raw position error signal.

16. The method of claim 1, wherein the read head is a magnetoresistive head.

17. The method of claim 1, wherein the readback signals are peak amplitude signals.

18. A storage device, comprising:
a read head that exhibits an asymmetric read sensitivity profile, the asymmetric read sensitivity profile of the read head characterized by a read sensitivity that varies asymmetrically over a width of the read head;
a storage medium mounted to allow relative movement between the read head and the storage medium, the storage medium including a correction track; and
a servo control system configured to:
generate readback signals dependent upon the asymmetric read sensitivity profile of the read head by moving the read head over the correction track;
determine a characteristic value of the asymmetric read sensitivity profile using the readback signals;
generate the raw position error signal using the read head; and
using the characteristic value of the asymmetric read sensitivity profile to adjust the raw position error signal.

19. The storage device of claim 18, wherein servo control system is configured to generate readback signals by:
moving the read head to a plurality of locations with respect to the correction track on a disk; and
measuring a readback signal at each location.

20. The storage device of claim 19, wherein moving the read head includes applying an incremental offset to the raw PES signal.

21. The storage device of claim 20, wherein the incremental offset to the raw PES signal corresponds to a distance of about of about 2% of the width of the read head.

22. The storage device of claim 20, wherein the servo control system is configured to determine the characteristic value by:
developing cumulative sum data; and
using the cumulative data to determine the characteristic value.

23. The storage device of claim 22, wherein the cumulative sum data is developed using the relationship:

$$Sum(Z_i) = \sum_{n=0}^{i} e(Z_n)$$

where $Z_i$ is a PES offset at a number i of forced PES offsets from a reference offset $Z_0$, $e(Z_n)$ is a readback signal magnitude at a PES offset $Z_n$, and Sum ($Z_i$) is a cumulative sum of the readback signal magnitudes from the reference PES offset $Z_0$ to the PES offset $Z_i$.

24. The storage device of claim 23, wherein the characteristic value is determined from the relationship:

$$CV = \frac{Z(P1) + Z(P2)}{P1 - P2}$$

where CV is the characteristic value, P1 and P2 are percentages of a maximum value of the cumulative sum data, Z(P1) and Z(P2) are PES offsets at the percentages P1 and P2 respectively.

25. The storage device of claim 24, wherein P1 is about 95% and P2 is about 5%.

26. The storage device of claim 25, wherein the servo control system is configured to use the characteristic value by generating a corrected PES signal according to the relationship:

$$PES_{cor} = PES_{raw} - \alpha \Delta OFF$$

where $PES_{cor}$ is the corrected PES signal, $PES_{raw}$ is the raw PES signal, and $\alpha$ is a correction coefficient.

27. The storage device of claim 26, wherein $\alpha$ is about 1.

28. The storage device of claim 24, wherein the servo control system is configured to use the characteristic value to adjust the raw position error signal by generating an offset correction value $\Delta$OFF according to the relationship:

$$\Delta OFF = CV_t - CV_0$$

where $CV_t$ is a characteristic value at a time t and $CV_o$ is a characteristic value at a time $t_o$.

29. The storage device of claim 18, wherein the correction track comprises a micro-track.

30. The storage device of claim 18, wherein the read head is a magnetoresistive head.

31. The storage device of claim 18, wherein the readback signals are peak amplitude signals.

32. A method of correcting for offset in a raw position error signal of a storage system having one or more data storage disks and one or more read heads, each of the read heads exhibiting an asymmetric read sensitivity profile, comprising:

writing a micro-track on the disk in a protected area of at least one of the disks;

periodically moving a selected one of the read heads over the micro-track to generate readback signal amplitudes dependent upon the asymmetric read sensitivity profile of the selected read head by moving the selected read head over the micro-track, the asymmetric read sensitivity profile of the selected read head characterized by a read sensitivity that varies asymmetrically over a width of the selected read head;

determining a characteristic value approximating the median of the asymmetric read sensitivity profile using the readback signal amplitudes;

generating the raw position error signal using the selected read head, and using the characteristic value of the asymmetric read sensitivity profile to adjust the raw position error signal.

* * * * *